US012185364B2

(12) United States Patent
Chin et al.

(10) Patent No.: US 12,185,364 B2
(45) Date of Patent: Dec. 31, 2024

(54) WIRELESS COMMUNICATION METHOD AND USER EQUIPMENT FOR HANDLING RANDOM ACCESS OPERATIONS

(71) Applicant: SHARP KABUSHIKI KAISHA, Sakai (JP)

(72) Inventors: Heng-Li Chin, Taipei (TW); Hsin-Hsi Tsai, Taipei (TW); Chia-Hung Wei, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/170,818

(22) Filed: Feb. 8, 2021

(65) Prior Publication Data

US 2021/0250989 A1    Aug. 12, 2021

Related U.S. Application Data

(60) Provisional application No. 62/971,572, filed on Feb. 7, 2020.

(51) Int. Cl.
*H04W 72/00* (2023.01)
*H04W 28/02* (2009.01)
(Continued)

(52) U.S. Cl.
CPC ..... *H04W 74/002* (2013.01); *H04W 28/0278* (2013.01); *H04W 72/1268* (2013.01);
(Continued)

(58) Field of Classification Search
CPC ........... H04W 74/008; H04W 28/0278; H04W 72/1257; H04W 72/1268; H04W 72/1289;
(Continued)

(56) References Cited

U.S. PATENT DOCUMENTS

2018/0070382 A1   3/2018   Lee et al.
2019/0387541 A1   12/2019  Agiwal et al.
(Continued)

FOREIGN PATENT DOCUMENTS

| WO | 2016/144084 A1 | 9/2016 | |
| WO | 2018232259 A1 | 12/2018 | |
| WO | WO-2021138572 A1 * | 7/2021 | ........ H04W 72/1263 |

OTHER PUBLICATIONS

3GPP (Medium Access Control (MAC) protocol specification, 3GPP TS 38.321v15.8.0, Dec. 2019).*
(Continued)

*Primary Examiner* — Lakeram Jangbahadur
(74) *Attorney, Agent, or Firm* — ScienBiziP, P.C.

(57) ABSTRACT

A wireless communication method and a User Equipment (UE) for performing Random Access (RA) operations are provided. The communication method is performed by the UE and includes receiving a Radio Resource Control (RRC) message that indicates a first Physical Uplink Shared Channel (PUSCH) resource for Message A (MSGA) payload transmission; triggering a Scheduling Request (SR) procedure; initiating an RA procedure after receiving the RRC message, in a case that no Physical Uplink Control Channel (PUCCH) resource is configured for the SR procedure; determining that a second PUSCH resource is available while the RA procedure is ongoing, the second PUSCH resource not being indicated by the RRC message as the first PUSCH resource; and stopping the ongoing RA procedure in a case that a Medium Access Control (MAC) Protocol Data Unit (PDU) including a Buffer Status Reporting (BSR) MAC Control Element (CE) is transmitted on the second PUSCH resource or the second PUSCH resource can accommodate all pending data for transmission.

10 Claims, 9 Drawing Sheets

(51) Int. Cl.
H04W 72/1268 (2023.01)
H04W 72/23 (2023.01)
H04W 72/50 (2023.01)
H04W 74/00 (2009.01)
H04W 74/0833 (2024.01)
H04W 76/27 (2018.01)
H04W 80/02 (2009.01)

(52) U.S. Cl.
CPC ......... H04W 72/23 (2023.01); H04W 72/535 (2023.01); H04W 74/0833 (2013.01); H04W 76/27 (2018.02); H04W 80/02 (2013.01)

(58) Field of Classification Search
CPC . H04W 72/14; H04W 74/0833; H04W 76/27; H04W 80/02; H04W 72/1284; H04W 74/006
See application file for complete search history.

(56) References Cited

U.S. PATENT DOCUMENTS

| 2020/0196327 | A1  | 6/2020  | Zhang et al. |
| 2021/0144582 | A1* | 5/2021  | Yi ........................ H04W 72/12 |
| 2021/0410200 | A1* | 12/2021 | Cirik .................. H04W 74/004 |
| 2022/0217743 | A1* | 7/2022  | Zhou ................ H04W 72/1289 |

OTHER PUBLICATIONS

Zhou et al U.S. Appl. No. 62/955,882, filed Dec. 2019.*
3GPP TS 38.321 V15.8.0 (Dec. 2019) 3rd Generation Partnership Project; Technical Specification Group Radio Access Network; NR; Medium Access Control (MAC) protocol specification (Release 15).
Samsung: "Introduction of two-step RACH in NR", R1-1913627, 3GPP TSG-RAN WG1 Meeting #99, Reno, USA, Nov. 18-22, 2019.
LG Electronics Inc.: "Discussion for clarifying the meaning of RA initiation", R2-1815452, 3GPP TSG-RAN WG2 Meeting #103bis, Chengdu, China, Oct. 8-12, 2018.
Xiaomi Communications: "Cases of Early Stop of RA procedure for SI Request", R2-1818153, 3GPP TSG-RAN2 #104, Spokane, USA, Nov. 12-16, 2018.
3GPP TS 38.331, "3rd Generation Partnership Project; Technical Specification Group Radio Access Network; NR; Radio Resource Control (RRC) protocol specification (Release 15)", V15.7.0 (Sep. 2019).
3GPP TS 38.321, "3rd Generation Partnership Project; Technical Specification Group Radio Access Network; NR; Medium Access Control (MAC) protocol specification (Release 15)", V15.7.0 (Sep. 2019).
3GPP TS 38.300, "3rd Generation Partnership Project; Technical Specification Group Radio Access Network; NR; NR and NG-RAN Overall Description; Stage 2 (Release 15)", V15.7.0 (Sep. 2019).
3GPP TS 38.331, "3rd Generation Partnership Project; Technical Specification Group Radio Access Network; NR; Radio Resource Control (RRC) protocol specification (Release 15)", V15.8.0 (Dec. 2019).
3GPP TS 38.300, "3rd Generation Partnership Project; Technical Specification Group Radio Access Network; NR; NR and NG-RAN Overall Description; Stage 2 (Release 15)", V15.8.0 (Dec. 2019).
3GPP TS 38.213, "3rd Generation Partnership Project; Technical Specification Group Radio Access Network; NR; Physical layer procedures for control (Release 15)", V15.8.0 (Dec. 2019).
3GPP TS 38.101-1, "3rd Generation Partnership Project; Technical Specification Group Radio Access Network; NR; User Equipment (UE) radio transmission and reception; Part 1: Range 1 Standalone (Release 15)", V15.8.2 (Dec. 2019).
3GPP TS 38.101-2, "3rd Generation Partnership Project; Technical Specification Group Radio Access Network; NR; User Equipment (UE) radio transmission and reception; Part 2: Range 2 Standalone (Release 15)", V15.8.0 (Dec. 2019).
3GPP TS 38.214, "3rd Generation Partnership Project; Technical Specification Group Radio Access Network; NR; Physical layer procedures for data (Release 15)", V15.8.0 (Dec. 2019).
3GPP TS 38.211, "3rd Generation Partnership Project; Technical Specification Group Radio Access Network; NR; Physical channels and modulation (Release 15)", V15.8.0 (Dec. 2019).
3GPP TS 38.101-3, "3rd Generation Partnership Project; Technical Specification Group Radio Access Network; NR; User Equipment (UE) radio transmission and reception; Part 3: Range 1 and Range 2 Interworking operation with other radios (Release 15)", V15.7.0 (Sep. 2019).
Nokia et al: "On 2-step Random Access Procedure", 3GPP Draft; R1-1901192, 3GPP TSG RAN WG1 Ad-Hoc Meeting 1901, Taipei, Taiwan, Jan. 21-25, 2019 (Jan. 20, 2019).

* cited by examiner

WIRELESS COMMUNICATION METHOD AND USER EQUIPMENT FOR HANDLING RANDOM ACCESS OPERATIONS

CROSS-REFERENCE TO RELATED APPLICATION(S)

The present disclosure claims the benefit of and priority to provisional U.S. Patent Application Ser. No. 62/971,572 ("the '572 provisional"), filed on Feb. 7, 2020, entitled "Method and Apparatus to Handle 2-step Random Access Procedure." The content(s) of the '572 provisional are fully incorporated herein by reference for all purposes.

FIELD

The present disclosure is generally related to wireless communications, and more specifically, to a wireless communication method and a User Equipment (UE) for performing Random Access (RA) operations.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to a wireless communication method and a UE for handling RA operations.

According to an aspect of the present disclosure, a communication method of a UE for performing RA operations is provided. The communication method includes receiving a Radio Resource Control (RRC) message that indicates a first Physical Uplink Shared Channel (PUSCH) resource for Message A (MSGA) payload transmission; triggering a Scheduling Request (SR) procedure; initiating an RA procedure after receiving the RRC message, in a case that no Physical Uplink Control Channel (PUCCH) resource is configured for the SR procedure; determining that a second PUSCH resource is available while the RA procedure is ongoing, the second PUSCH resource not indicated by the RRC message as the first PUSCH resource; and stopping the ongoing RA procedure in a case that a Medium Access Control (MAC) Protocol Data Unit (PDU) including a Buffer Status Reporting (BSR) MAC Control Element (CE) is transmitted on the second PUSCH resource or the second PUSCH resource can accommodate all pending data for transmission.

According to another aspect of the present disclosure, a UE is for performing Random Access (RA) operations is provided. The UE includes a processor and a memory coupled to the processor. The memory stores at least one computer-executable program that, when executed by the processor, causes the processor to receive an RRC message that indicates a first PUSCH resource for MSGA payload transmission; trigger an SR procedure; initiate an RA procedure after receiving the RRC message, in a case that no PUCCH resource is configured for the SR procedure; determine that a second PUSCH resource is available while the RA procedure is ongoing, the second PUSCH resource not indicated by the RRC message as the first PUSCH resource; and stop the ongoing RA procedure in a case that a MAC PDU including a BSR MAC CE is transmitted on the second PUSCH resource or the second PUSCH resource can accommodate all pending data for transmission.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DESCRIPTION

Figure 1:
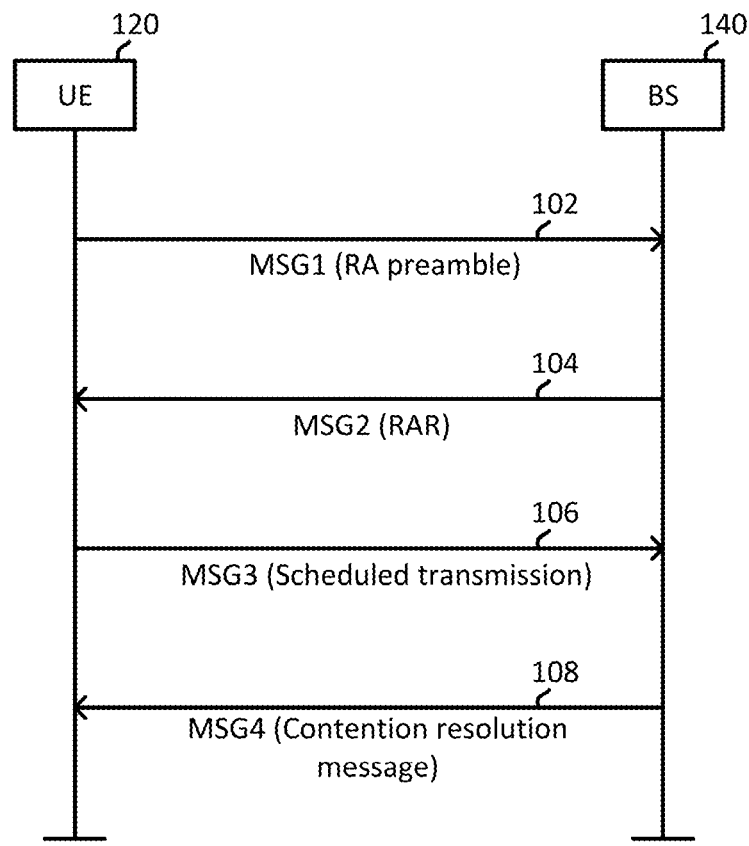
FIG. 1 illustrates a 4-step Contention-Based Random Access (CBRA) according to an implementation of the present disclosure.

The acronyms mentioned in the present disclosure are defined as follows. Unless otherwise specified, the terms in the present disclosure have the following meanings.

Abbreviation Full Name
 3GPP 3rd Generation Partnership Project
 5G 5th generation
 BA Bandwidth Aggregation
 BFR Beam Failure Recovery
 BS Base Station
 BSR Buffer Status Reporting
 BWP Band Width Part
 CA Carrier Aggregation
 CBRA Contention-Based Random Access
 CC Component Carriers
 CCCH Common Control CHannel
 CE Control Element
 CFRA Contention-Free Random Access CG Cell Group
C-RNTI Cell-Radio Network Temporary Identifier
CS-RNTI Configured Scheduling-Radio Network Temporary Identifier
CSI Channel State Information
CSI-RS Channel State Information based Reference Signal
CQI Channel Quality Indicator
DCI Downlink Control Information
DL Downlink
DRB Data Radio Bearer
HARQ Hybrid Automatic Repeat Request
HO Handover
ID Identifier
IE Information Element
L1 Layer 1
L2 Layer 2
LCG Logical Channel Group
LCH Logical Channel
LCP Logical Channel Prioritization
LTE Long Term Evolution
MAC Medium Access Control
MCG Master Cell Group
MIMO Multi-input Multi-output
MSG0 Message 0
MSG1 Message 1
MSG2 Message 2
MSG3 Message 3
MSG4 Message 4
MSGA Message A
MSGB Message B
NR New Radio
NUL Normal Uplink
NW Network
PCell Primary Cell
PDCCH Physical Downlink Control Channel
PDCP Packet Data Convergence Protocol
PDU Protocol Data Unit
PHY Physical Layer
PRACH Physical Random Access Channel
PSCell Primary SCell
PUCCH Physical Uplink Control Channel
PUSCH Physical Uplink Shared Channel
QoS Quality of Service
RA Random Access
RACH Random Access Channel
RAR Random Access Response
Rel-15 Release 15
Rel-16 Release 16
RLC Radio Link Control
RLF Radio Link Failure
RNTI Radio Network Temporary Identifier
RRC Radio Resource Control
RS Reference Signal
RSRP Reference Signal Received Power
RTT Round Trip Time
SCell Secondary Cell
SCG Secondary Cell Group
SDU Service Data Unit
SI System Information
SIB System Information Block
SR Scheduling Request
SRB Signaling Radio Bearer
SRS Sounding Reference Signal
SSB Synchronization Signal Block
SpCell Special Cell
SUL Supplementary Uplink
TA Timing Advance
TAG Timing Advance Group
TC-RNTI Temporary Cell Radio Network Temporary Identifier
TR Technical Report
TRP Transmission/Reception Point
TS Technical Specification
UE User Equipment
UL Uplink
UL-SCH Uplink Shared Channel The following contains specific information pertaining to example implementations in the present disclosure. The drawings and their accompanying detailed disclosure are directed to merely example implementations of the present disclosure. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the figures. However, the features in different implementations may differ in other respects, and Therefore shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a specific feature, structure, or characteristic, but not every possible implementation of the present disclosure necessarily includes the specific feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the specific feature, structure, or characteristic, and should instead be understood to mean "at least some implementations of the present disclosure" includes the stated specific feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the disclosed combination, group, series, and the equivalent. The terms "system" and "network" in the present disclosure may be used interchangeably.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. The character "/" used herein generally represents that the former and latter associated objects are in an "or" relationship.

Additionally, for a non-limiting explanation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will immediately recognize that any network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Applications Specific Integrated Circuitry (ASIC), programmable logic arrays, and/or using one or more Digital Signal Processors (DSPs). Although some of the example implementations disclosed are oriented to software installed and executing on computer hardware, alternative example implementations implemented as firmware or as hardware or combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) may typically include at least one Base Station (BS), at least one UE, and one or more optional network elements that provide connection towards a network. The UE may communicate with the network (e.g., a Core Network (CN), an Evolved Packet Core (EPC) network, an Evolved Universal Terrestrial Radio Access Network (E-UTRAN), a Next-Generation Core (NGC), or an Internet), through a Radio Access Network (RAN) established by the BS.

A UE according to the present disclosure may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE may be configured to receive and transmit signals over an air interface to one or more cells in an RAN.

A BS according to the present disclosure may include, but is not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the SGC, a next-generation Node B (gNB) as in the 5G Access Network (5G-AN), and any other apparatus capable of controlling radio communication and managing radio resources within a cell. The BS may connect to serve the one or more UEs through a radio interface to the network.

The BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols mentioned previously.

The BS may provide radio coverage to a specific geographical area using a plurality of cells included in the RAN. The BS may support the operations of the cells. Each cell may provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the network dynamics of NR. Besides, an SL resource may also be provided in an NR frame to support ProSe services.

In NR, a BS may allocate UL resources to a UE in consideration of a BSR provided by the UE. If the UE has a demand for UL transmissions but has not configured with UL resource(s) for transmitting the BSR, the UE may transmit an SR to request the UL resource(s). An RA procedure may be initiated if the UE finds that there is no available UL resource for the SR transmission.

Buffer Status Report (BSR) Procedure

A BSR procedure may be supported to let a UE provide the network with information about the UL data volume in the MAC entity. A BSR procedure may be triggered by a UE whenever certain condition(s) is satisfied. There are various types of BSR procedures, e.g., a regular BSR procedure, a padding BSR procedure, and a periodic BSR procedure. A UE may trigger the various types of BSR procedures based on different conditions.

For example, a regular BSR procedure may be triggered if any of the following Conditions (1) and (2) are satisfied:
  Condition (1): UL data, for an LCH which belongs to an LCG, becomes available to the MAC entity, and either (i) this UL data belongs to an LCH with higher priority than the priority of any LCH containing available UL data which belong to any LCG, or (ii) none of the LCHs which belong to an LCG contains any available UL data; and
  Condition (2): a BSR retransmission timer (e.g., retxBSR-Timer, which is specified in 3GPP TS 38.331 V15.7.0) expires, and at least one of the LCHs which belong to an LCG contains UL data.

A padding BSR procedure may be triggered if UL resources are allocated, and the number of padding bits is equal to or larger than the size of the BSR MAC CE plus the BSR MAC CE's subheader.

A periodic BSR procedure may be triggered if a periodic BSR timer (e.g., periodicBSR-Timer, which is specified in 3GPP TS 38.331 V15.7.0), expires.

The network (e.g., BS) may schedule a UE a PUSCH resource via a dynamic UL grant (e.g., via DCI), an UL grant provided by an RAR, or RRC signaling (e.g., via RRC configuration). When a UE determines that at least one BSR procedure has been triggered and not cancelled, a BSR MAC CE may be generated by the UE if the UE has a PUSCH resource available for transmission (and with enough size to accommodate the BSR MAC CE plus its subheader).

The UE may generate either a long BSR MAC CE, short BSR MAC CE, long truncated BSR MAC CE, or shorted truncated BSR MAC CE based on the number of LCG(s) which has data available when the BSR MAC CE is to be built and/or the type of BSR procedure that has been triggered when the BSR MAC CE is to be built. On the other hand, if a UE determines that at least one regular BSR procedure has been triggered and not cancelled, and a specific timer (e.g., logicalChannelSR-DelayTimer, which is specified in 3GPP TS 38.331 V15.7.0) configured for the UE is not running, the UE may trigger an SR procedure if any of the following Conditions (1) to (3) is satisfied:
  Condition (1): there is no UL-SCH resource available for a new transmission;
  Condition (2): the MAC entity is configured with configured UL grant(s) and the regular BSR procedure was triggered for an LCH for which logicalChannelSR-Mask (which is a parameter specified in 3GPP TS 38.331 V15.7.0) is set to false; and
  Condition (3): the UL-SCH resources available for a new transmission do not meet the LCP mapping restrictions configured for the LCH that triggered the BSR procedure.

UL-SCH resources may be considered available if the (UE's) MAC entity has an active configuration for any type of configured UL grants (e.g., configured grant Type 1, configured grant Type 2, etc.), or if the MAC entity has received a dynamic UL grant (e.g., via DCI on a PDCCH), or if both of these conditions are met. If the MAC entity has determined at a given time point that the UL-SCH resources are available, this need not imply that UL-SCH resources are available for use at that time point.

Scheduling Request (SR) Procedure

In NR, an SR procedure may be triggered/initiated for generating and transmitting an SR for requesting an UL resource (e.g., UL-SCH resource) for a new transmission. The (UE's) MAC entity may be configured with zero, one, or more SR configurations. An SR configuration may configure a set of PUCCH resources for SR transmission across different BWPs and/or cells. For an LCH, at most one PUCCH resource for SR transmission is configured based on a per-BWP basis. Only PUCCH resources on a BWP which is active at the time of SR transmission occasion may be considered valid.

Each SR configuration may correspond to one or more LCHs. Each LCH may map to zero or one SR configuration, which is configured by RRC. The SR configuration of the LCH that triggered the BSR procedure (if such a configuration exists) is considered as the corresponding SR configuration for the triggered SR procedure.

When an SR procedure is triggered, it may be considered as pending until it is cancelled. If a pending SR procedure is not configured with any valid/available PUCCH resource, the MAC entity may initiate an RA procedure on the SpCell and cancel the pending SR procedure. Otherwise, the MAC entity may instruct the physical layer to signal/transmit the SR on one valid PUCCH resource for the pending SR procedure.

Random Access (RA) Procedure

In NR, two types of RA procedures are supported:
  (1) 4-step RA type; and
  (2) 2-step RA type.

A CFRA procedure with a 4-step RA type may be referred to as a "4-step CFRA." A CBRA procedure with a 4-step RA type may be referred to as a "4-step CBRA." A CFRA procedure with a 2-step RA type may be referred to as a "2-step CFRA." A CBRA procedure with a 2-step RA type may be referred to as a "2-step CBRA." A 4-step RA procedure (which is also referred to as a "4-step RA" in the present disclosure) may be a 4-step CFRA or a 4-step CBRA. A 2-step RA procedure (which is also referred to as a "2-step RA" in the present disclosure) may be a 2-step CFRA or a 2-step CBRA.

As described previously, both types of RA procedures may support CBRA and CFRA. Examples of the various types of RA procedures are described with reference to FIGS. 1, 2, 3 and 4.

FIG. 1 illustrates a 4-step Contention-Based Random Access (CBRA) according to an implementation of the present disclosure. The 4-step CBRA includes actions 102, 104, 106 and 108. In action 102, a UE 120 may transmit a MSG1 including an RA preamble to a BS 140. In action 104, the BS 140 may transmit a MSG2 (e.g., an RAR) to the UE 120 in response to receiving the MSG1. In action 106, the UE 120 may transmit a MSG3 to the BS 140 in a scheduled transmission (e.g., scheduled by the UL grant provided by RAR). The MSG3 may include a CCCH SDU or a specific RNTI (e.g., C-RNTI). In action 108, the UE 120 may receive a MSG4 (e.g., including a contention resolution message) from the BS 140.

In a case that the UE 120 has transmitted a specific RNTI (e.g., C-RNTI) on a PUSCH in action 106, and the UE 120 receives a PDCCH addressed to the specific RNTI (e.g., C-RNTI) that schedules MSG4, the UE 120 may consider the contention resolution to be successful. In another case that the UE 120 has transmitted a CCCH SDU on a PUSCH in action 106, and the UE 120 receives a MSG4 including a contention resolution that matches the transmitted CCCH SDU, the UE may consider the contention resolution to be successful. Moreover, the UE may consider the RA procedure (e.g., 4-step CBRA in the example of FIG. 1) to have been successfully completed if the contention resolution is considered successful.

Figure 2:
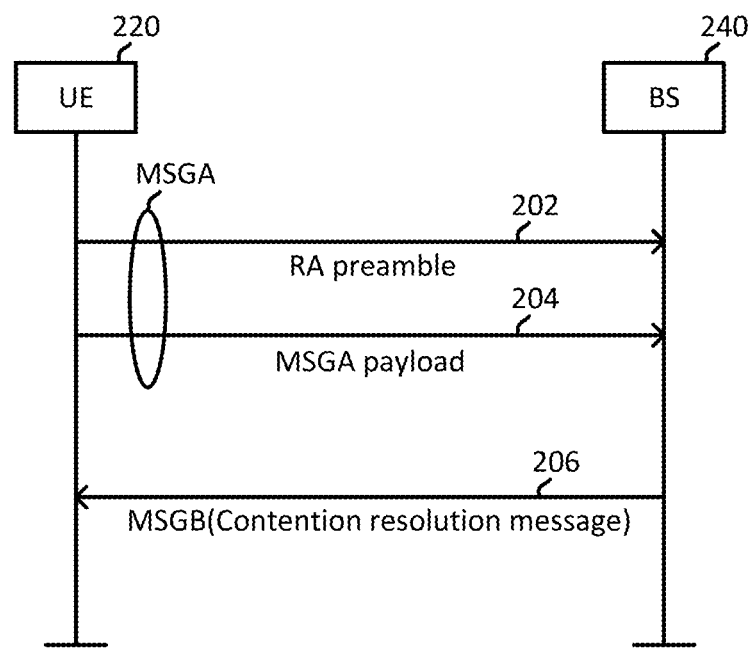
FIG. 2 illustrates a 2-step CBRA according to an implementation of the present disclosure.

FIG. 2 illustrates a 2-step CBRA according to an implementation of the present disclosure. The 2-step CBRA may include actions 202, 204 and 206, where action 202 together with action 204 may be considered a MSGA transmission for the UE 220.

As illustrated in FIG. 2, an RA preamble may be transmitted in action 202 and a MSGA payload may be transmitted in action 204. A MSGA payload may be transmitted on a PUSCH resource. Moreover, the RA preamble and/or the PUSCH resource for MSGA payload transmission may be configured/scheduled via cell-specific RRC signaling (before initiating an RA procedure that involves action 202, 204, and 206). In action 206, the UE may receive a MSGB that includes a contention resolution message from the BS 240.

Figure 3:
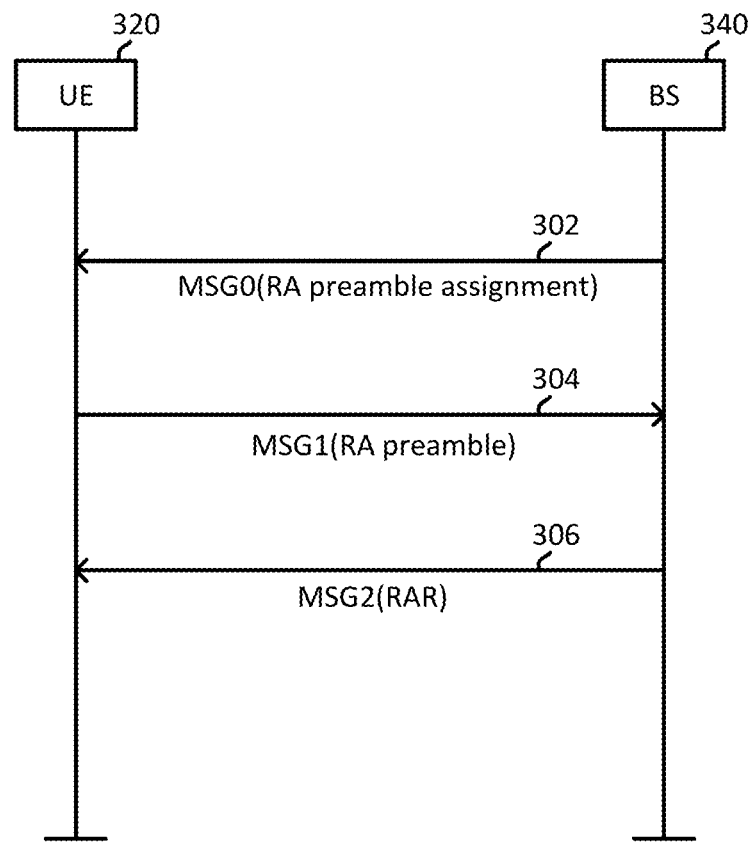
FIG. 3 illustrates a 4-step CFRA according to an implementation of the present disclosure.

FIG. 3 illustrates a 4-step CFRA according to an implementation of the present disclosure. The 4-step CBRA includes actions 302, 304 and 306.

As illustrated in FIG. 3, a UE 320 may receive an RA preamble assignment (e.g., via MSG0) from a BS 340 in action 302. The RA preamble assignment may indicate a resource allocation of an RA preamble transmission. The UE 320 may transmit a MSG1 (e.g., including an RA preamble) according to the indicated resource allocation in action 304. In action 306, a MSG2 (e.g., an RAR), as a response to the MSG1, may be received by the UE 320.

Figure 4:
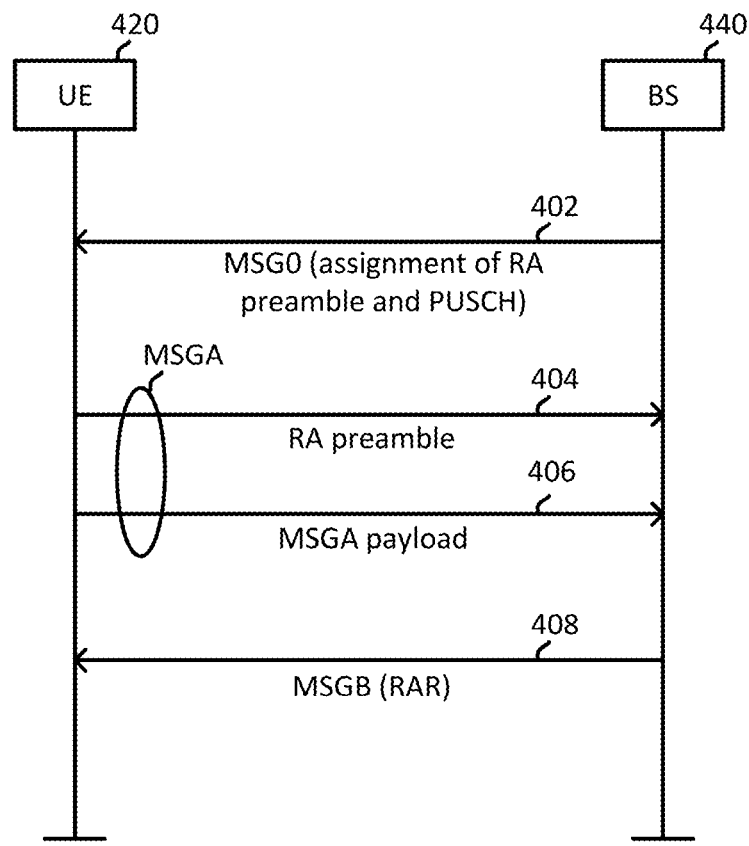
FIG. 4 illustrates a 2-step Contention-Free Random Access (CFRA) according to an implementation of the present disclosure.

FIG. 4 illustrates a 2-step CFRA according to an implementation of the present disclosure. As illustrated in FIG. 4, the 2-step CFRA may include actions 402, 404, 406 and 408.

In action 402, a UE 420 may receive an assignment of an RA preamble (transmission) and an assignment of a PUSCH (resource) for MSGA payload transmission from a BS 440 via a MSG0. MSG0 may be dedicated RRC signaling. MSG0 may be transmitted before an RA procedure is initiated (i.e., it may not be part of the RA procedure).

After the MSG0 reception, the UE 420 may perform a MSGA transmission (when conditions to initiate a 2-step CFRA procedure is satisfied), in which an RA preamble and a MSGA payload are transmitted in actions 404 and 406, respectively. In action 408, the UE 420 may receive a MSGB (e.g., an RAR) from the BS 440.

As described previously, for an RA procedure with a 2-step RA type (e.g., 2-step CFRA or 2-step CBRA), a MSGA may include an RA preamble transmitted on a PRACH and a MSGA payload transmitted on a PUSCH resource. After the MSGA transmission, the UE may monitor for a response from the network within a configured time window (e.g., MSGB response window). For a 2-step CFRA, the UE may end the 2-step CFRA (or consider the 2-step CFRA completed) upon receiving the network response. For a 2-step CBRA, if the contention resolution is considered successful upon receiving the network response (e.g., MSGB), the UE may end the 2-step CBRA.

Figure 5:
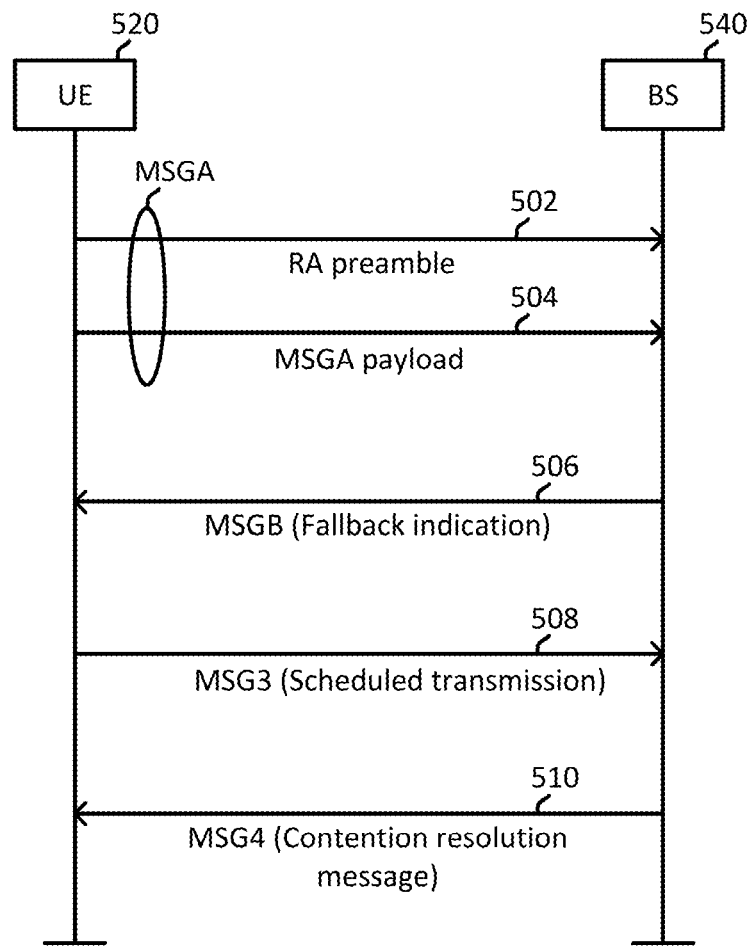
FIG. 5 illustrates a fallback from a 2-step CBRA to a 4-step CBRA, according to an implementation of the present disclosure.

FIG. 5 illustrates a fallback from a 2-step CBRA to a 4-step CBRA, according to an implementation of the present disclosure. As illustrated in FIG. 5, at first the RA procedure performed by the UE 520 is a 2-step CBRA, during which an RA preamble is transmitted in action 502 and a MSGA payload is transmitted in action 504. Action 502 together with action 504 may be referred to as a MSGA transmission.

In action 506, the UE 520 may receive, from the BS 540, a MSGB that includes a fallback indication (e.g., fallback-RAR). Once the fallback indication is received in the MSGB, the UE 520 may transmit a MSG3 to the BS 540 in a scheduled transmission (e.g., scheduled by an UL grant provided by a MSGB) in action 508 and monitor a contention resolution message in a MSG4 in action 510. If the contention resolution is not successful after the UE transmits the MSG3(s), the UE 520 may perform the MSGA transmission again. If the 2-step CBRA is not completed after a number of MSGA transmissions, the UE may switch to perform a 4-step CBRA.

For an RA procedure initiated in a cell configured with an SUL, the network may explicitly indicate to the UE which carrier to use (e.g., to use either an UL or an SUL). Otherwise, the UE may select the SUL to use only if the measured quality of the DL (e.g., RSRP value) is lower than a threshold that is broadcast by the network. The UE may perform the carrier selection before selecting an RA type (e.g., a 2-step RA type or a 4-step RA type) of the RA procedure. The threshold (e.g., an RSRP threshold) used in the RA type selection may be configured separately for an UL and an SUL. Once started, all UL transmissions of the RA procedure may be performed on the selected carrier.

When CA is configured, an RA procedure with a 2-step RA type may only be performed on a PCell. For an RA procedure with a 4-step RA type, the transmission/reception of MSG1, MSG2 and MSG3 for a CBRA may always occur on a PCell, and the MSG4 (contention resolution) transmission/reception may be cross-scheduled by the PCell. For example, the UE may receive the contention resolution on an SCell.

On the other hand, the transmission/reception of MSG1, MSG2 and MSG3 for a CFRA may occur on a PCell. A CFRA on an SCell may only be initiated by the gNB to establish the TA for a secondary TAG. For example, a CFRA procedure may be initiated by the gNB with a PDCCH order (e.g., action 302 of FIG. 3) that is sent on a scheduling cell of an activated SCell of the secondary TAG, an RA preamble transmission (e.g., action 304 of FIG. 3) may occur on the indicated SCell, and an RAR (e.g., action 306 of FIG. 3) may be received on the PCell.

An RA procedure may be triggered by at least one of the following events:
Initial access from RRC IDLE;
RRC Connection Re-establishment procedure;
DL or UL data arrival during RRC_CONNECTED when UL synchronisation status is "non-synchronised";
UL data arrival during RRC_CONNECTED when there are no PUCCH resources for SR transmission available;
SR transmission failure;
Request by RRC upon synchronous reconfiguration (e.g., handover);
Transition from RRC_INACTIVE;
To establish time alignment for a secondary TAG;
Request for Other SI; and
Beam failure recovery.

For a 2-step CBRA or a 2-step CFRA, there are some assumptions (1 to 21) as follows:
1. Configurations of 2-step RA and/or 4-step selection may be based on indicating to all UEs via SIB, or dedicated configuration in RRC_CONNECTED/RRC_INACTIVE/IDLE state.
2. UE may retry MSGA retransmission (e.g., preamble and PUSCH) for 2-step RA if an attempt of the 2-step RA fails.
3. For a MSGA with a C-RNTI, the UE may monitor the PDCCH addressed to the C-RNTI for success response and/or MSGB-RNTI.
4. For contention resolution of the 2-step RACH procedure, any of the sub-assumptions 4-1, 4-2 and 4-3 is applied, where:
4-1. if the PDU PDCCH addressed to the C-RNTI (e.g., the C-RNTI included in the MSGA) containing a 12-bit TA command is received, the UE may consider the contention resolution to be successful and stop the reception of MSGB or with UL grant if the UE is synchronized already;
4-2. if the corresponding fallbackRAR is detected, the UE may stop monitoring the PDCCH addressed to the corresponding C-RNTI for successful response and process the fallback operation accordingly; and
4-3. if neither corresponding fallbackRAR nor PDCCH addressed to the C-RNTI is detected within the response window, the UE may consider the MSGA attempt failed and do back off operation based on the backoff indicator if received in MSGB.
5. Network response to MSGA (e.g., MSGB/MSG2) may include the following: SuccessRAR, fallbackRAR, and/or Backoff Indication.
6. The following fields may be included in the successRAR when CCCH message is included in MSGA: Contention resolution ID, C-RNTI, and/or TA command.
7. Upon receiving the fallbackRAR, the UE shall proceed to MSG3 step of 4-step RACH procedure.
8. fallbackRAR may contain the following fields: RAPID, UL grant (to retransmit the MSGA payload), TC-RNTI, and/or TA command.
9. RA type selection (e.g., to select 2-step RA or 4-step RA) is performed before beam selection.
10. No need to re-execute RA selection criteria upon fallback failure (i.e., if the reception of MSG3 fails). The UE re-transmits using MSGA.
11. Network may configure the number of times "N," a UE may attempt to re-transmit MSGA for "N" times during the RA procedure.
12. RA type selection is NOT left up to UE implementation.
13. If the UE is configured with 2-step RA, the RSRP is above a configurable threshold then the UE shall use the RA procedure with 2-step RA type.
14. 2-step RACH resources may only be configured on SpCell.
15. The 2-step RACH resources may be configured on a BWP where 4-step CBRA resources are not configured. In that case we may not have 4-step switch.
16. The 2-step CBRA for SpCell BFR is supported in Rel-16.
17. If 4-step CFRA resource is configured, the UE may select 4-step RACH in RA procedure initialization.
18. If no qualified beam with 4-step CFRA resource can be found, the UE may fall back to 4-step CBRA. The 2-step CFRA and 4-step CFRA may not be configured at the same time.
19. For random access initiated by PDCCH order, if PDCCH order includes non-zero RA preamble index, UE selects 4 step RA. For example, UE may perform legacy CFRA.
20. Allow configurations where switching to 4-step RA is not supported even when 2-step RA and 4-step RA are configured in the BWP.
21. HARQ process ID 0 is used for MSGA payload transmission.

For a 2-step RA procedure, e.g., a 2-step CFRA triggered for handover, there are some assumptions (1 to 9) as follows:
1. 2-step CFRA and 4-step CFRA cannot be configured simultaneously for a BWP.
2. For 2-step CFRA for handover, the UE may monitor the PDCCH of the target cell for the response from the gNB identified by the C-RNTI while the msgB-ResponseWindow is running. The RA procedure is considered successful upon reception of a transmission addressed to the C-RNTI containing at least the 12 bit TAC MAC CE.
3. Rebuilding is NOT supported: This means the CFRA payload size matches one of the payload sizes for CBRA and UE includes C-RNTI in MSGA for CFRA.
4. In the case of 2-step CFRA, once MSGA is transmitted the UE monitors MSGB-RNTI (in addition to C-RNTI—i.e. same as CBRA).
5. The initial RA type is always determined to be 2-step RA if 2-step CFRA is configured in handover.
6. Similar to 4-step RA, the UE then searches for a suitable CFRA beam with configured CFRA resources for 2-step RA type.
7. RAN2 assumes that SSB and CSI-RS based 2-step CFRA can be supported. If there are RAN1 impacts then CSI-RS configuration may not be supported.
8. The PUSCH resource for 2-step CFRA associated with the dedicated preamble may be configured to the UE via dedicated signaling (e.g., may not be included in SIB1).
9. The 2-step CFRA is configured only on BWP where 2-step CBRA is configured.

A UE may be configured/indicated a UL resource (e.g., PUSCH resource) for UL (data) transmission by the network via the any of following approaches (1 to 6):
1. Indicated by a UL grant via (or provided by) DCI (e.g., a dynamic resources allocated to UE via the C-RNTI on PDCCH);
2. Indicated by a UL grant via (or provided by) RAR during a 4-step RA procedure. In this case, the PUSCH resource is used for transmitting MSG3 (e.g., action 106 of FIG. 1).
3. Indicated by a UL grant via (or provided by) MSGB, e.g., with fallbackRAR, during a 2-step RA procedure. In this case, the PUSCH resource is used for transmitting MSG3 (e.g., action 106 of FIG. 1).
4. Configured by the network via UE-specific RRC signaling, e.g., ConfiguredGrantConfig IE. In this case, this PUSCH resource corresponds to the configured grant configuration provided by (the same) ConfiguredGrantConfig IE. Two types of configured uplink grants (e.g., Type 1 and Type 2) may be defined. With Type 1, the RRC layer may directly provide the configured uplink grant (including the periodicity). With Type 2, the RRC layer may define the periodicity of the configured uplink grant while PDCCH addressed to CS-RNTI can either signal and activate the configured uplink grant, or deactivate it. For example, a PDCCH addressed to a CS-RNTI indicates that the UL grant can be implicitly reused according to the periodicity defined by the RRC layer until deactivated.

5. Configured by the network via cell-specific RRC signaling for MSGA, e.g., via msgA-PUSCH-Config IE (e.g., a configuration of cell-specific MSGA PUSCH parameters which the UE uses for contention-based and/or contention-free MSGA payload transmission). In this case, the PUSCH resource may be used for transmitting the payload of the MSGA. In this case, the PUSCH resource corresponds to/is part of MSGA (e.g., the PUSCH resource for MSGA payload transmission) of a 2-step (CB)RA procedure (e.g., the MSGA in FIG. 2 or 5). In this case, the cell-specific RRC signaling for MSGA may be transmitted, by the network, before the UE initiates a 2-step (CB)RA procedure.

6. Configured by the network via UE-specific RRC signaling for MSGA, e.g., via MsgA-CFRA-PUSCH IE (e.g., a configuration of UE-specific MSGA PUSCH parameters which the UE uses for contention-free MSGA payload transmission). In this case, the PUSCH resource may be used for transmitting the payload of the MSGA. In this case, the PUSCH resource corresponds to/is part of MSGA (e.g., the PUSCH resource for MSGA payload transmission) of a 2-step (CF)RA procedure (e.g., the MSGA in FIG. 4 or 5). In this case, the UE-specific RRC signaling for MSGA may be transmitted, by the network, before the UE initiates a 2-step (CF)RA procedure.

Based on NR Rel-15 MAC specification, a UE may stop, if any, an ongoing RA procedure initiated by MAC entity prior to the MAC PDU assembly due to a (triggered and) pending SR procedure which has no valid PUCCH resources configured. Such an RA procedure may be stopped when the MAC PDU is transmitted using an UL grant other than an UL grant provided by an RAR, and this PDU includes a BSR MAC CE which contains buffer status up to (and including) the last event that triggered a BSR procedure prior to the MAC PDU assembly, or when the UL grant(s) can accommodate all pending data available for transmission. The reason the UE may stop the RA procedure in this case is because the purpose of initiating the RA procedure, e.g., to request an (dedicated) UL grant, is reached. Since the BSR MAC CE (or pending data available for transmission) is transmitted on a UL resource (e.g., PUSCH resource) scheduled by the network via dedicated signaling (e.g., via RRC signaling or DCI) with HARQ, the retransmission resource may be provided by the network if the BSR MAC CE (or data) is not successfully received by the network.

Based on NR Rel-15 MAC specification, a UE may stop, if any, an ongoing RA procedure initiated by MAC entity prior to the MAC PDU assembly due to a (triggered and) pending SR procedure which has no valid PUCCH resources configured. Such an RA procedure may be stopped when the MAC PDU is transmitted using an UL grant other than an UL grant provided by an RAR, and this PDU includes a BSR MAC CE which contains buffer status up to (and including) the last event that triggered a BSR procedure prior to the MAC PDU assembly, or when the UL grant(s) can accommodate all pending data available for transmission.

The reason the UE may stop the RA procedure in this case is because the purpose of initiating the RA procedure, e.g., to request an (dedicated) UL grant, is reached. Since the BSR MAC CE (or pending data available for transmission) is transmitted on a UL resource (e.g., PUSCH resource) scheduled by the network via dedicated signaling (e.g., via RRC signaling or DCI) with HARQ, the retransmission resource may be provided by the network if the BSR MAC CE (or data) is not successfully received by the network.

Nevertheless, some problems may occur if reusing the conditions to stop an RA procedure specified in NR Rel-16. For instance, NR Rel-16 includes a 2-step RA procedure.

If an RA procedure is initiated by a UE due to the absence of valid PUCCH resources for the pending SR procedure (triggered by the UE), the UE may select the 2-step RA type as the RA type of the RA procedure (e.g., the UE may set the RA_TYPE to 2-stepRA). Subsequently, if the UE transmits a BSR MAC CE on the PUSCH resource of MSGA and this BSR MAC CE contains buffer status up to (and including) the last event that triggered a BSR procedure prior to the MAC PDU assembly, the UE may stop the ongoing RA procedure. The reason may be that the PUSCH resource for transmitting the MSGA is other than an UL grant provided by an RAR.

As a result, the UE may stop monitoring the MSGB since the corresponding RA procedure has been stopped. In this case, the UE can neither be informed by the network via explicit/implicit message (e.g., via fallbackRAR or a MSGB) nor initiate relevant recovery mechanisms (e.g., retransmission of preamble/MSGA) if the MSGA (where BSR MAC CE or UL data is transmitted) is not successfully received by the network. Therefore, the UE may be failed to transmit the BSR MAC CE. Some implementations are provided to resolve those problems.

A UE may trigger SR procedure(s) (e.g., due to triggered (regular) BSR procedure(s)). Subsequently, the UE may initiate an RA procedure, namely RA procedure 1, if any of the triggered and pending SR procedure is not configured with a valid PUCCH resource (on the current active UL BWP). Moreover, if RA procedure 1 has been initiated, the UE may stop the ongoing RA procedure 1 if one or more or any combination of the following conditions 1 to 6 are satisfied:

1. A MAC PDU is transmitted on a specific UL resource (e.g., PUSCH resource). Furthermore, this MAC PDU includes a BSR MAC CE which contains buffer status up to (and including) the last event that triggered a BSR procedure prior to the MAC PDU assembly. The specific UL resource (e.g., PUSCH resource) may not be a UL resource provided by an UL grant in RAR (that corresponds to RA procedure 1). The specific UL resource (e.g., a PUSCH resource) may not be a UL resource that is as part of a MSGA (e.g., the PUSCH resource for MSGA payload transmission). For example, the ongoing RA procedure 1 may be a 2-step RA. The UE may transmit the MAC PDU via the (PUSCH resource for) MSGA payload transmission (as part of RA procedure 1). When the MAC PDU is transmitted on the (PUSCH resource for) MSGA payload transmission (as part of RA procedure 1), the UE may continue the ongoing RA procedure. The UE may continue the ongoing RA procedure 1.

2. A MAC PDU is transmitted on a specific UL resource (e.g., PUSCH resource). Furthermore, this MAC PDU includes a BSR MAC CE which contains buffer status up to (and including) the last event that triggered a BSR procedure prior to the MAC PDU assembly. Furthermore, the BSR MAC CE includes buffer status from specific LCG(s). The specific UL resource (e.g., PUSCH resource) may not be a UL resource provided by an UL grant in Random Access Response (that corresponds to RA procedure 1). The specific UL resource (e.g., PUSCH resource) may not be a UL resource as part of a MSGA (e.g., the PUSCH resource for MSGA payload transmission). A specific LCG may refer to an LCG with specific LCG IDs. A specific LCG may refer to an LCG consisting specific LCHs. The specific LCH may refer to an LCH with a specific LCH ID. The specific LCH may refer to an LCH that is (not) explicitly indicated by the network via RRC signaling/MAC CE/DCI. The network may provide the indication via an LCH configuration (e.g., determined by the LogicalChannelConfig IE). The specific LCH may refer to an LCH which has a priority value of higher/lower than a threshold, where the threshold may be configured by the network via RRC signaling/MAC CE/DCI. The priority value may be specified in 3GPP TS 38.331 V15.7.0.

3. A specific UL resource (e.g., PUSCH resource) becomes available for transmission and the UL resource can accommodate all pending data available for transmission. The specific UL resource (e.g., PUSCH resource) may not be an UL resource provided by an UL grant in RAR (that corresponds to RA procedure 1). The specific UL resource (e.g., PUSCH resource) may not be a UL resource as part of a MSGA (e.g., the PUSCH resource for MSGA payload transmission). In one example, the ongoing RA procedure 1 may be a 2-step RA. The UE may transmit all pending data available for transmission via the (PUSCH resource for) MSGA (as part of RA procedure 1). When all pending data available for transmission is transmitted on the (PUSCH resource for) MSGA, the UE may continue the ongoing RA procedure 1. The UE may continue the ongoing RA procedure 1. In another example, the ongoing RA procedure 1 may be a 2-step RA. A PUSCH resource for MSGA payload transmission, which is part of the ongoing RA procedure 1, may become available for transmission, and the PUSCH resource may accommodate all pending data available for transmission. However, the UE may continue the ongoing RA procedure 1 in the present example. Moreover, in the present example, the PUSCH resource for MSGA payload transmission may become available for transmission when RA procedure 1 is initiated.

4. A specific UL resource (e.g., PUSCH resource) becomes available for transmission and the UL resource can accommodate all pending data available for transmission. Furthermore, the pending data (at the UE) that available for transmission includes data from specific LCH(s). The specific UL resource (e.g., PUSCH resource) may not be a UL resource provided by an UL grant in Random Access Response (that corresponds to RA procedure 1). The specific UL resource (e.g., PUSCH resource) may not be a UL resource as part of a MSGA (e.g., the PUSCH resource for MSGA payload transmission). The specific LCH may refer to an LCH which has a specific priority value. The priority value may be configured by, e.g., the LogicalChannelConfig IE. The specific LCH may refer to an LCH that is (not) explicitly indicated by the network via RRC signaling/MAC CE/DCI. The network may provide the indication via the LogicalChannelConfig IE. The specific LCH may refer to an LCH which has a priority value of higher/lower than a specific threshold. The threshold may be configured by the network via RRC signaling/MAC CE/DCI. The (triggered and pending) SR procedure that causes the initiation of RA procedure 1 may be triggered by the specific LCH. For example, the SR procedure may be triggered by a BSR procedure, and the BSR procedure may be triggered by the specific LCH. The specific LCH may refer to an LCH which has a specific priority value. The priority value may be configured in the LogicalChannelConfig IE. The specific LCH may refer to an LCH that is (not) explicitly indicated by the network via RRC signaling/MAC CE/DCI. The network may provide the indication via the LogicalChannelConfig IE. The specific LCH may refer to an LCH which has a priority value of higher/lower than a specific threshold. The threshold may be configured by the network via RRC signaling/MAC CE/DCI.

5. The (triggered and pending) SR procedure that causes the initiation of RA procedure 1 is triggered from a specific SR configuration. The specific SR configuration may refer to an SR configuration that is (not) explicitly indicated by the network via RRC signaling/MAC CE/DCI. The network may provide such an indication via either the SchedulingRequestResourceConfig IE (which is specified in 3GPP TS 38.331 V15.7.0) or the SchedulingRequestToAddMod IE (which is specified in 3GPP TS 38.331 V15.7.0).

6. The UE selects a 4-step RA type (e.g., the UE sets the RA_TYPE to 4-stepRA) for RA procedure 1. For example, the UE may select the 4-step RA type (e.g., the UE set the RA_TYPE to 4-stepRA) as the RA type of RA procedure 1 during the phase of Random Access Procedure Initialization. In other words, the UE may continue the ongoing RA procedure if the RA type is a 2-step RA type (even if the condition(s) to stop the ongoing RA procedure described in 3GPP TS 38.321 V15.7.0 or mentioned previously is satisfied).

If a (2-step) RA procedure has been initiated by a UE due to a triggered SR procedure with no valid PUCCH resource (configured on the current active UL BWP) being configured, the UE may continue the ongoing (2-step) RA procedure if a MAC PDU has been transmitted on a PUSCH resource for MSGA payload transmission (corresponding to the RA procedure) or a PUSCH resource provided by an UL grant in RAR. This means that the UE may continue the ongoing (2-step) RA procedure even if the MAC PDU includes a BSR MAC CE which contains buffer status up to (and including) the last event that triggered a BSR procedure prior to the MAC PDU assembly. In contrast, the UE may stop the ongoing (2-step) RA procedure if a MAC PDU has been transmitted on a PUSCH resource that is neither part of a MSGA (e.g., the PUSCH resource for MSGA payload transmission) nor provided via an UL grant in RAR, and this MAC PDU includes a BSR MAC CE which contains buffer status up to (and including) the last event that triggered a BSR procedure prior to the MAC PDU assembly.

If an RA procedure has been initiated by a UE due to a triggered SR procedure with no valid PUCCH resource (configured on the current active UL BWP) being configured, the UE may continue the ongoing RA procedure due to the available UL grant provided by an RAR or for MSGA payload transmission. This implies that the UE may continue the ongoing RA procedure even if the UE has been configured with a PUSCH resource for MSGA payload transmission and the PUSCH resource can accommodate all pending data available for transmission. In contrast, the UE may stop the ongoing RA procedure if the UE has an available PUSCH resource that is neither part of a MSGA (e.g., the PUSCH resource for MSGA payload transmission) nor provided by a UL grant in RAR, and this PUSCH resource can accommodate all pending data available for transmission. An example of the corresponding UE behavior is illustrated in Table 1.

TABLE 1

The MAC entity may stop, if any, ongoing RA procedure due to a pending SR procedure which has no valid PUCCH resources configured, which was initiated by MAC entity prior to the MAC PDU assembly. Such an RA procedure may be stopped when the MAC PDU is transmitted using a UL grant other than a UL grant provided by an RAR and other than a UL grant that schedules the PUSCH resource for MSGA payload transmission, and this PDU includes a BSR MAC CE which contains buffer status up to (and including) the last event that triggered a BSR procedure prior to the MAC PDU assembly, or when the UL grant(s) can accommodate all pending data available for transmission.

If an RA procedure has been initiated by a UE due to a triggered SR procedure with no valid PUCCH resource (configured on the current active UL BWP) being configured, the UE may stop the ongoing RA procedure if the UE selects the 4-step RA type (e.g., the UE set the RA_TYPE to 4-stepRA) as the RA type of this RA procedure. For example, the UE may stop this ongoing RA procedure if a MAC PDU has been transmitted on a PUSCH resource not provided by an RAR and this MAC PDU includes a BSR MAC CE which contains buffer status up to (and including) the last event that triggered a BSR procedure prior to the MAC PDU assembly, where the PUSCH resource not provided by an RAR may be one of the PUSCH resource types listed subsequently:
- the PUSCH resource may correspond to a configured UL grant (e.g., configured grant Type 1, configured grant Type 2, etc.);
- the PUSCH resource may be indicated by DCI; and
- the PUSCH resource may be part of a MSGA (e.g., the PUSCH resource for MSGA payload transmission).

If the UE selects a 2-step RA type (e.g., the UE set the RA_TYPE to 2-stepRA) as the RA type of this RA procedure, the UE may continue the ongoing RA procedure even if a BSR MAC CE is transmitted (on a PUSCH resource not provided by an RAR) and the BSR MAC CE contains buffer status up to (and including) the last event that triggered a BSR procedure prior to the MAC PDU assembly.

If an RA procedure has been initiated by a UE due to a triggered SR procedure with no valid PUCCH resource (configured on the current active UL BWP) being configured, the UE may stop the ongoing RA procedure if the UE selects a 4-step RA type (e.g., the UE set the RA_TYPE to 4-stepRA) as the RA type of this RA procedure. The UE may stop this ongoing RA procedure if the UE has an available PUSCH resource not provided by an RAR and the PUSCH resource can accommodate all the pending data available for transmission. Here, the PUSCH resource not provided by an RAR may be one of the PUSCH resource listed subsequently:
- the PUSCH resource may correspond to a configured UL grant (e.g., configured grant Type 1, configured grant Type 2, etc.);
- the PUSCH resource may be indicated by DCI; and
- the PUSCH resource may be part of a MSGA (e.g., the PUSCH resource for MSGA payload transmission).

If the UE selects a 2-step RA type (e.g., the UE set the RA_TYPE to 2-stepRA) as the RA type of this RA procedure, the UE may continue the ongoing RA procedure even if it has available PUSCH resource (not provided by an RAR) that can accommodate all the pending data available for transmission. An example of the corresponding UE behavior is illustrated in Table 2.

TABLE 2

The MAC entity may stop, if any, ongoing 4-step Random Access procedure (e.g., the UE sets the RA_TYPE to 4-stepRA) due to a pending SR procedure which has no valid PUCCH resources configured, which was initiated by MAC entity prior to the MAC PDU assembly. Such a 4-step Random Access procedure may be stopped when the MAC PDU is transmitted using a UL grant other than a UL grant provided by Random Access Response, and this PDU includes a BSR MAC CE which contains buffer status up to (and including) the last event that triggered a BSR procedure prior to the MAC PDU assembly, or when the UL grant(s) can accommodate all pending data available for transmission.

Assuming that a UE is configured with both 2-step RA resources and 4-step RA resources, the UE may initiate an RA procedure and perform an RA type selection in which a 4-step RA type or a 2-step RA type may be selected as the RA type of the RA procedure. The 2-step RA type may not be selected (e.g., the UE may not set the RA_TYPE to 2-stepRA and the UE may select the 4-step RA type as the RA type of the RA procedure) for the initiated RA procedure if the RA procedure meets one or more or any combination of the following conditions (1 to 3):
1. The RA procedure is initiated due to a triggered and pending SR procedure which has no valid PUCCH resource (configured for the UE's active UL BWP). More specifically, the UE may not select a 2-step CFRA and/or a 2-step CBRA to initiate/trigger.
2. The RA procedure is initiated due to a triggered and pending SR procedure which has no valid PUCCH resource (configured for the UE's active UL BWP). The pending SR procedure may correspond to a specific SR configuration. The specific SR configuration may be determined based on an explicit indication provided by the network. For example, the network may provide the explicit indication via at least one of the SchedulingRequestResourceConfig IE (which is specified in 3GPP TS 38.331 V15.7.0), the SchedulingRequestToAddMod IE (which is specified in 3GPP TS 38.331 V15.7.0), and etc. The UE may determine that the triggered and pending SR procedure corresponds to a specific SR configuration if the explicit indication is (not) provided for the corresponding SR configuration. An SR configuration may be considered as the specific SR configuration if the SR configuration corresponds to a specific SR ID (e.g., SchedulingRequestId, which is specified in 3GPP TS 38.331 V15.7.0).
3. The RA procedure is initiated due to a triggered (regular) BSR procedure and an SR procedure that is triggered by the (regular) BSR procedure, and the triggered SR procedure has no valid PUCCH resource (configured for the UE's active UL BWP) for the RA procedure. The (regular) BSR procedure may be triggered by a specific LCH. The specific LCH may be an LCH with a specific priority value which is configured by the network via the LogicalChannelConfig IE (which is specified in 3GPP TS 38.331 V15.7.0). The specific LCH may be determined based on an explicit indication provided by the network. For example, the network may provide the explicit indication via the LogicalChannelConfig IE (which is specified in 3GPP TS 38.331 V15.7.0). The UE may determine that the triggered (regular) BSR procedure corresponds to the specific LCH if the explicit indication is (not) provided for the corresponding LCH.

If an RA procedure is initiated by a UE due to a triggered and pending SR procedure with no valid PUCCH resource (configured for the UE's active UL BWP) being configured, the UE may not select a 2-step RA type (e.g., the UE may not set the RA_TYPE to 2-stepRA) for this RA procedure. As such, the possibility to stop this RA procedure due to the transmission of a BSR MAC CE on a PUSCH resource for MSGA payload transmission can be eliminated, thereby improving the efficiency in telecommunications.

A UE may trigger an SR procedure if one or more or any combination of the following conditions 1 to 3 are satisfied:
1. at least one regular BSR procedure has been triggered and is not cancelled;
2. an LCH-related timer (e.g., logicalChannelSR-Delay-Timer) is not running; and
3. there is no UL-SCH resources available for a new transmission. UL-SCH resources may be considered available if the (UE's) MAC entity has been configured with a PUSCH resource corresponding to a MSGA of a 2-step RA. UL-SCH resources may be considered available if the MAC entity has received a dynamic UL grant. UL-SCH resources may be considered available if the MAC entity has an active configuration for either type of configured UL grants.

If a UE has triggered a regular BSR procedure and the logicalChannelSR-DelayTimer configured for the UE is not running, the UE may trigger an SR procedure if the conditions 1 to 3 as follows have all been satisfied:
1. the UE is not configured with any PUSCH resource corresponding to a MSGA of a 2-step RA;
2. the UE has not received a dynamic UL grant; and
3. the UE does not have an active configuration for either type of configured UL grants.

A UE may initiate a 2-step RA if at least one (regular) BSR procedure has been triggered and one or more or any combination of the following conditions 1 to 4 are satisfied:
1. The UE is configured with a 2-step RA-related configuration. The 2-step RA-related configuration may be a PUSCH resource configuration that corresponds to a MSGA of a 2-step RA, where the PUSCH resource may be provided by the network via system information.
2. Either one of the criteria to select a 2-step RA has been satisfied. One of the criteria to select a 2-step RA may be that the DL pathloss reference is larger than a preconfigured threshold (e.g., rsrp-Threshold-msgA). One of the criteria to select a 2-step RA may be that the (UL) BWP selected for the RA procedure is only configured with 2-step RA resources (i.e., no 4-step RACH resources are configured). One of the criteria to select a 2-step RA may be that the CFRA resources for a 2-step RA are configured.
3. The UE has not received a dynamic UL grant.
4. The UE does not have an active configuration for either type of configured UL grants.

If at least one (regular) BSR procedure has been triggered by a UE, the UE may initiate a 2-step RA if the UE has been configured with a 2-step RA-related configuration (e.g., a PUSCH resource configuration corresponding to a MSGA) and has neither received a dynamic UL grant nor an active configuration for either type of configured UL grants.

If a 2-step RA has been initiated due to a triggered (regular) BSR procedure, the UE may cancel the ongoing 2-step RA procedure if one or more or any combination of the following conditions 1 and 2 are satisfied:
1. A MAC PDU is transmitted on a specific UL resource (e.g., PUSCH resource). The MAC PDU may include a BSR MAC CE which contains buffer status up to (and including) the last event that triggered a BSR prior to the MAC PDU assembly. The specific UL resource (e.g., PUSCH resource) may not be an UL resource provided by an RAR (that corresponds to RA procedure 1). The specific UL resource (e.g., PUSCH resource) may not be a UL resource as part of a MSGA (e.g., the PUSCH resource for MSGA payload transmission) (that corresponds to RA procedure 1).
2. A specific UL resource (e.g., PUSCH resource) becomes available for transmission and the UL resource can accommodate all pending data available for transmission. The specific UL resource (e.g., PUSCH resource) may not be an UL resource provided by an UL grant in RAR (that corresponds to RA procedure 1). The specific UL resource (e.g., PUSCH resource) may not be a PUSCH resource as part of a MSGA (e.g., the PUSCH resource for MSGA payload transmission) (that corresponds to RA procedure 1). Note that a PUSCH resource may be scheduled/indicated by an UL grant. On the other hand, in the present disclosure, a PUSCH resource may become available for transmission if the UE receives an UL grant that schedules/indicates the PUSCH resource.

Figure 6:
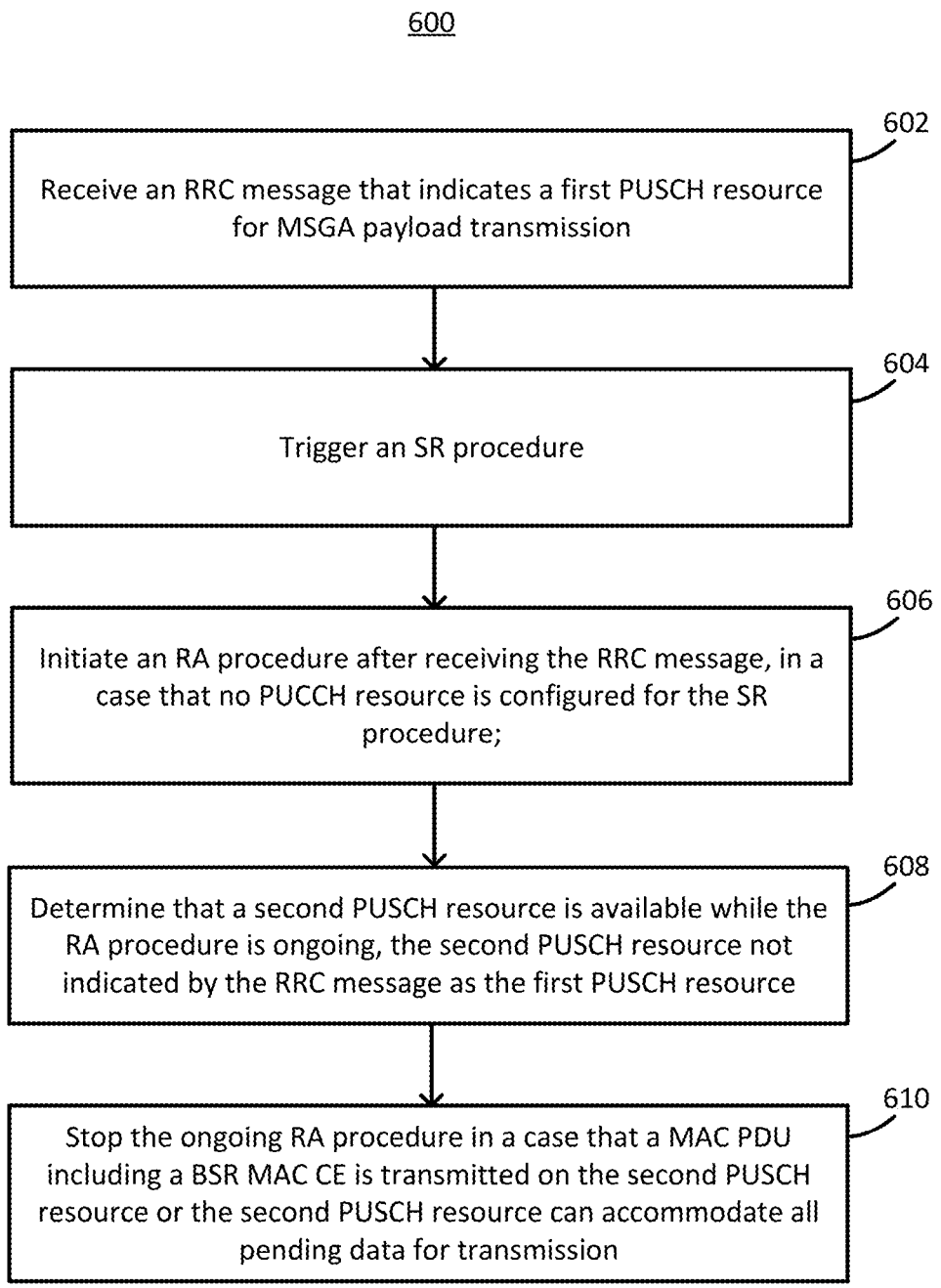
FIG. 6 illustrates a flowchart for a wireless communication method of a UE for performing RA operations, according to an implementation of the present disclosure.

FIG. 6 illustrates a flowchart for a wireless communication method 600 of a UE for performing RA operations, according to an implementation of the present disclosure. Although actions 602, 604, 606, 608 and 610 are illustrated as separate actions represented as independent blocks in FIG. 6, these separately illustrated actions should not be construed as necessarily order dependent. The order in which the actions are performed in FIG. 6 is not intended to be construed as a limitation, and any number of the disclosed blocks may be combined in any order to implement the method, or an alternate method. Moreover, each of actions 602, 604, 606, 608 and 610 may performed independent of other actions, and can be omitted in some implementations of the present disclosure.

In action 602, a UE may receive an RRC message that indicates a first PUSCH resource for MSGA payload transmission.

The RRC message includes a PUSCH configuration for MSGA that indicates an allocation of the first PUSCH resource. The PUSCH configuration for MSGA may correspond to (or determined by) the MsgA-PUSCH-Config IE. Alternatively, the PUSCH configuration may correspond to (or determined by) the msgA-CFRA-PUSCH IE.

In action 604, the UE may trigger an SR procedure. For example, the UE may trigger the SR procedure for requesting UL resource(s) for new transmission(s). For example, the UE may trigger the SR procedure due to a triggered BSR procedure.

In action 606, the UE may initiate an RA procedure after receiving the RRC message, in a case that no PUCCH resource is configured for the SR procedure. In other words, since no PUCCH resource is configured for the SR procedure, no UL resource can be used for SR transmission. Therefore, the UE may initiate/trigger the RA procedure (e.g., a 2-step RA) using the PUSCH configuration for MSGA (MsgA-PUSCH-Config).

In action 608, the UE may consider a second PUSCH resource available while the RA procedure is ongoing, where the second PUSCH resource is not indicated by the RRC message as the first PUSCH resource. The second PUSCH resource may be determined as available in a case that the second PUSCH resource is scheduled by DCI. The second PUSCH resource may be determined as available in a case that the second PUSCH resource corresponds to an active configured grant configuration. The second PUSCH resource may be an UL resource not used for MSGA payload transmission. The second PUSCH resource may not be scheduled by an RAR.

In action 610, the UE may stop the ongoing RA procedure in a case that a MAC PDU including a BSR MAC CE is transmitted on the second PUSCH resource or the second PUSCH resource can accommodate all pending data for transmission. The BSR MAC CE may contain buffer status up to (and including) the last event that triggered a BSR procedure prior to the MAC PDU assembly.

Since the UE may stop the RA procedure early without performing a complete RA procedure, the UE may not need to perform MSG1/MSG3/MSGA transmission and/or MSG2/MSG4/MSGB monitoring, thereby saving power consumption. Moreover, in the case of CBRA, the early termination of an RA procedure can reduce the number of UEs shared with the same pool of RA preambles. This means that a UE may have a reduced risk of selecting the same RA preamble as another UE and experiencing conflict or contention. Furthermore, an improved resource utilization may be achieved since the network can release the resources related to the RA procedure early.

Figure 7:
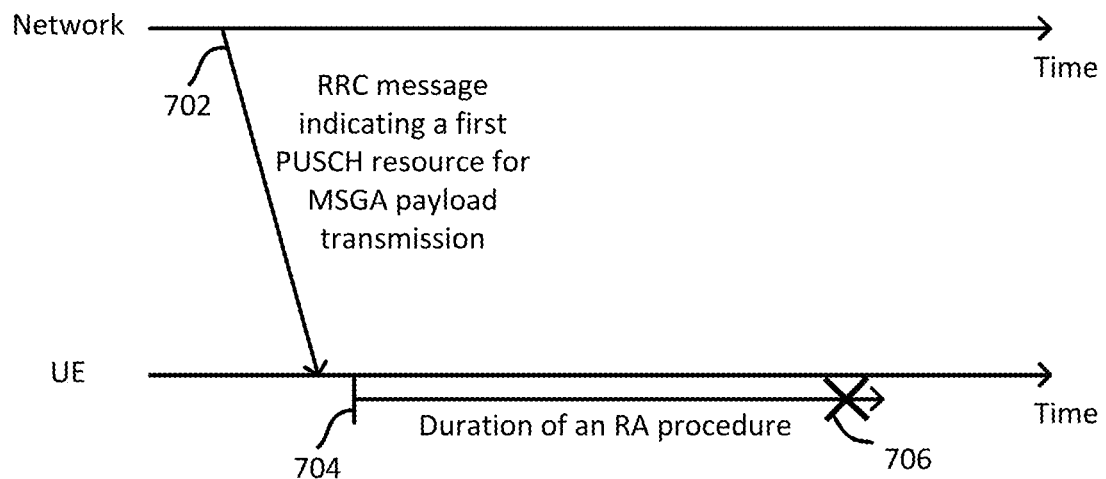
FIG. 7 illustrates an (ongoing) RA procedure that is stopped by a UE when a certain condition(s) is satisfied according to an implementation of the present disclosure.

FIG. 7 illustrates an (ongoing) RA procedure that is stopped by a UE when a certain condition(s) is satisfied according to an implementation of the present disclosure. As illustrated in FIG. 7, the network may transmit to the UE an RRC message indicating a first PUSCH resource for MSGA payload transmission in action 702. In other words, the network may allocate the first PUSCH resource for the UE to perform MSGA payload transmission via the RRC message. After receiving the RRC message, if the UE triggers an SR procedure but finds that no PUCCH resource is configured for the SR procedure, the UE may initiate an RA procedure in action 704. During the RA procedure (e.g., the RA procedure is ongoing and has not completed yet), the UE may stop the RA procedure in action 706 if the UE is also configured/scheduled with a second PUSCH resource (e.g., a PUSCH resource not scheduled/indicated by an RAR, or a PUSCH resource not used for MSGA payload transmission) that is available for UL transmission and at least one of the following conditions 1 to 2 is satisfied:

1. A MAC PDU including a BSR MAC CE that contains buffer status up to (and including) the last event that triggered a BSR procedure prior to the MAC PDU assembly is transmitted on the second PUSCH resource.
2. The second PUSCH resource can accommodate all pending data for transmission.

The UE may continue the RA procedure (e.g., keep the RA procedure ongoing, or does not stop the RA procedure) until the RA procedure is completed. For example, the UE may continue the RA procedure until the RA procedure is completed in a case that the MAC PDU (including the BSR MAC CE) is transmitted on the first PUSCH resource. For example, the UE may continue the RA procedure until the RA procedure is completed in a case that the MAC PDU (including the BSR MAC CE) is transmitted on a third PUSCH resource used for MSGA payload transmission.

Figure 8:
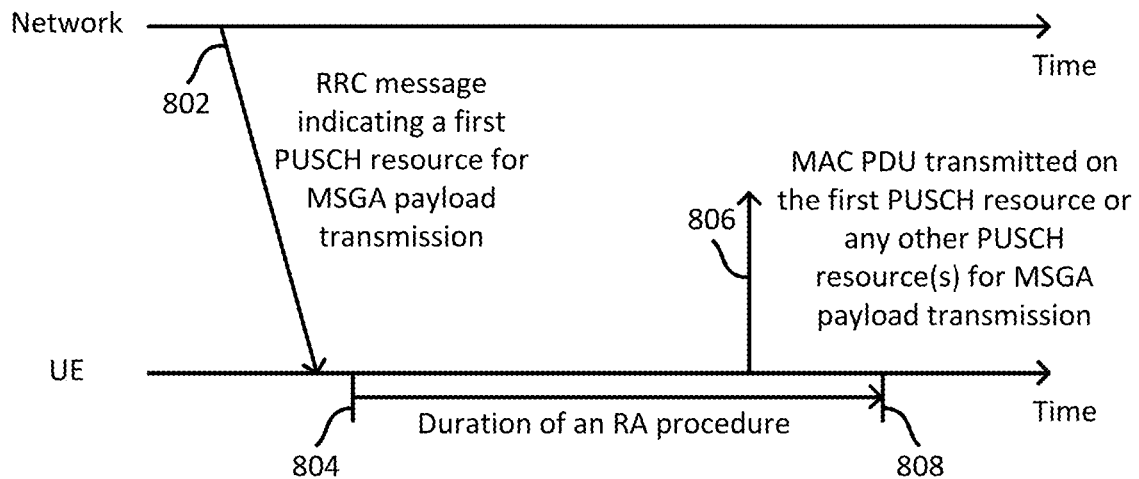
FIG. 8 illustrates an RA procedure that is continued until it is completed according to an implementation of the present disclosure.

FIG. 8 illustrates an RA procedure that is continued until it is completed according to an implementation of the present disclosure. In action 802, the network may transmit to the UE an RRC message indicating a first PUSCH resource for MSGA payload transmission. After receiving the RRC message, if the UE triggers an SR procedure but finds that no PUCCH resource is configured for the SR procedure, the UE may initiate an RA procedure in action 804. During the RA procedure (e.g., the RA procedure is ongoing and has not completed yet), if the UE has transmitted a MAC PDU (including a BSR MAC CE) on the first PUSCH resource or any other PUSCH resource(s) used for MSGA payload transmission in action 806, the UE may continue the RA procedure until the RA procedure is completed.

The completion of an RA procedure may imply that the RA procedure is either successfully completed or unsuccessfully completed. If the RA procedure is contention-based, the RA procedure may be successfully completed if the contention resolution is successful (e.g., the UE receives a MSG4/MSGB that corresponds to the identity of the UE). If the RA procedure is contention-free, the RA procedure may be successfully completed if the UE receives an RAR from the network via MSG2/MSGB after MSG1/MSGA transmission. The RA procedure may be unsuccessfully completed if the number of preamble transmissions (via MSG1/MSGA) during the RA procedure has reached a configured threshold.

The following may be used to further disclose terms, examples, embodiments, actions, and/or behaviours:

MSG1: preamble transmission of an RA procedure for an RA procedure with a 4-step RA type.

MSG2: RAR of an RA procedure for a 4-step RA type. An RAR may be a response to a MSG1 in a 4-step RA.

MSG3: message transmitted on a UL-SCH containing a C-RNTI MAC CE or CCCH SDU, submitted from upper layer and associated with the UE Contention Resolution Identity, as part of 4-step RA.

MSG4: a PDCCH transmission for the contention resolution in a 4-step RA procedure. If the UE considers the contention resolution of the RA procedure is successful, the UE may consider the RA procedure successfully completed.

MSGA: preamble and payload transmissions of a 2-step RA.

MSGB: response to MSGA in a 2-step RA. MSGB may consist of response(s) for contention resolution, fallback indication(s), and/or backoff indication.

preambleTransMax: the maximum number of RA preamble (or MSG1 preamble) transmissions performed before declaring a failure (e.g., RLF) and/or declaring an RA problem for (4-step and/or 2-step) RA procedure.

msgA-TransMax: the maximum number of MSGA preamble transmissions performed before switching to a 4-step RA type and/or declaring an RA problem for (2-step) RA procedure.

RAR: an RAR may (or may not) include both an RAR and a fallbackRAR.

UL grant: an UL grant may be used to indicate a PUSCH resource.

PUSCH resource: a PUSCH resource may also be referred to as a UL-SCH resource in the present disclosure.

User Equipment (UE): The UE may be referred to PHY/MAC/RLC/PDCP/SDAP entity. The PHY/MAC/RLC/PDCP/SDAP entity may be referred to the UE.

Network (NW): The NW may be a network node, a TRP, a cell (e.g., SpCell, PCell, PSCell, and/or SCell), an eNB, a gNB, and/or a base station.

Serving Cell: A PCell, a PSCell, or an SCell. The serving cell may be an activated or a deactivated serving cell.

Special Cell (SpCell): For Dual Connectivity operation the term Special Cell refers to the PCell of the MCG or the PSCell of the SCG depending on if the MAC entity is associated to the MCG or the SCG, respectively. Otherwise, the term Special Cell refers to the PCell. A Special Cell supports PUCCH transmission and contention-based Random Access, and is always activated.

Component Carrier (CC): The CC may be PCell, PSCell, and/or SCell.

MAC entity: the terms "MAC entity" and "UE" may be interchangeably utilized in the present disclosure.

Additionally, a UE may perform an RA procedure (with 2-step and/or 4-step RA types) based on the following:

RA Procedure

RA Procedure Initialization

An example of UE behavior for RA procedure initialization is illustrated in Table 3.

TABLE 3

The RA procedure may be is initiated by a PDCCH order, by the MAC entity itself, or by RRC for the events in accordance with TS 38.300. There is only one RA procedure ongoing at any point in time in a MAC entity. The RA procedure on an SCell shall only be initiated by a PDCCH order with ra-PreambleIndex different from 0b000000.
  If a new RA procedure is triggered while another is already ongoing in the MAC entity, it is
      up to UE implementation whether to continue with the ongoing procedure or start
      with the new procedure (e.g., for SI request).
    RRC configures the following parameters for the RA procedure:
- prach-ConfigurationIndex: the available set of PRACH occasions for the transmission of
  the Random Access Preamble;
- msgA-prach-ConfigurationIndex: the available set of PRACH occasions for the
  transmission of the Random Access Preamble for MSGA in 2-step random access;
- msgA-prach-ConfigurationIndexNew: Cell-specific additional PRACH configuration
  index for 2-step random access;
- preambleReceivedTargetPower: initial Random Access Preamble power;
- rsrp-ThresholdSSB: an RSRP threshold for the selection of the SSB. If the RA procedure
  is initiated for beam failure recovery, rsrp-ThresholdSSB used for the selection of the
  SSB within candidateBeamRSList refers to rsrp-ThresholdSSB in
  BeamFailureRecoveryConfig IE;
- rsrp-ThresholdCSI-RS: an RSRP threshold for the selection of CSI-RS. If the RA
  procedure is initiated for beam failure recovery, rsrp-ThresholdCSI-RS is equal to rsrp-
  ThresholdSSB in BeamFailureRecoveryConfig IE;
- rsrp-ThresholdSSB-SUL: an RSRP threshold for the selection between the NUL carrier
  and the SUL carrier;
- rsrp-Threshold-msgA: an RSRP threshold for selection of 2-step random access
- msgATransMax: The maximum number of MSGA transmissions after which, the UE
  sets to MSG1 transmission;
- candidateBeamRSList: a list of reference signals (CSI-RS and/or SSB) identifying the
  candidate beams for recovery and the associated Random Access parameters;
- recoverySearchSpaceId: the search space identity for monitoring the response of the
  beam failure recovery request;
- powerRampingStep: the power-ramping factor;
- msgApreamble-powerRampingStep: Power ramping step for MSGA preamble;
- powerRampingStepHighPriority: the power-ramping factor in case of prioritized RA
  procedure;
- msgApreamble-powerRampingStepHighPriority: the power-ramping factor in case of
  prioritized RA procedure with 2-step RA type;
- scalingFactorBI: a scaling factor for prioritized RA procedure;
- scalingFactorBIMsgA: a scaling factor for prioritized RA procedure with 2-step RA
  type;
- ra-PreambleIndex: Random Access Preamble;
- ra-ssb-OccasionMaskIndex: defines PRACH occasion(s) associated with an SSB in
  which the MAC entity may transmit a Random Access Preamble;
- msgA-ssb-sharedROmaskindex: Indicates the subset of 4-step random access ROs shared
  with 2-step random access ROs, if not configured then all 4-step random access ROs are
  available for 2-step random access;
- ra-OccasionList: defines PRACH occasion(s) associated with a CSI-RS in which the
  MAC entity may transmit a Random Access Preamble;
- ra-PreambleStartIndex: the starting index of Random Access Preamble(s) for on-
  demand SI request;
- preambleTransMax: the maximum number of Random Access Preamble transmission;
- ssb-perRACH-OccasionAndCB-PreamblesPerSSB: defines the number of SSBs mapped
  to each PRACH occasion and the number of contention-based Random Access
  Preambles mapped to each SSB;
- ssb-perRACH-OccasionAndCB-PreamblesPerSSB-msgA: Configuration of the number
  of SSBs per RO, and number of contention-based preambles for each SSB for 2-step
  random access;
- if groupBconfigured is configured, then Random Access Preambles group B is
  configured.
  - Amongst the contention-based Random Access Preambles associated with an SSB (as
    defined in TS 38.213), the first numberOfRA-PreamblesGroupA Random Access
    Preambles belong to Random Access Preambles group A. The remaining Random
    Access Preambles associated with the SSB belong to Random Access Preambles
    group B (if configured).

TABLE 3-continued

If Random Access Preambles group B is supported by the cell Random Access Preambles
    group B is included for each SSB.
- if Random Access Preambles group B is configured:
  - ra-Msg3SizeGroupA: the threshold to determine the groups of Random Access
    Preambles;
  - ra-MsgASizeGroupA: the threshold to determine the groups of Random Access
    Preambles for 2-step random access;
  - msg3-DeltaPreamble: $\Delta_{PREAMBLE\_Msg3}$ in TS 38.213;
  - msgADeltaPreamble: $\Delta_{PREAMBLE\_MsgA}$ in TS 38.213;
  - messagePowerOffsetGroupB: the power offset for preamble selection;
    - numberOfRA-PreamblesGroupA: defines the number of Random Access Preambles
      in Random Access Preamble group A for each SSB.
- the set of Random Access Preambles and/or PRACH occasions for SI request, if any;
- the set of Random Access Preambles and/or PRACH occasions for beam failure
  recovery request, if any;
- the set of Random Access Preambles and/or PRACH occasions for reconfiguration with
  sync, if any;
- ra-ResponseWindow: the time window to monitor RA response(s) (SpCell only);
- ra-ContentionResolutionTimer: the Contention Resolution Timer (SpCell only);
- msgB-ResponseWindow: the time window to monitor RA response(s) for 2-step random
  access (SpCell only).
        In addition, the following information for related Serving Cell is assumed to be
available for UEs:
- if Random Access Preambles group B is configured:
  - if the Serving Cell for the RA procedure is configured with supplementary uplink as
    specified in TS 38.331, and SUL carrier is selected for performing RA procedure:
    - $PC_{MAX,f,c}$ of the SUL carrier as specified in TS 38.101-1, TS 38.101-2, and TS
      38.101-3.
  - else:
    - $P_{CMAX,f,c}$ of the NUL carrier as specified in TS 38.101-1, TS 38.101-2, and TS
      38.101-3.
        The following UE variables are used for the RA procedure:
- PREAMBLE_INDEX;
- PREAMBLE_TRANSMISSION_COUNTER;
- PREAMBLE_POWER_RAMPING_COUNTER;
- PREAMBLE_POWER_RAMPING_STEP;
- PREAMBLE_RECEIVED_TARGET_POWER;
- PREAMBLE_BACKOFF;
- PCMAX;
- SCALING_FACTOR_BI;
- TEMPORARY_C-RNTI;
- RA_TYPE;
- POW_OFFSET_2STEP_RA.
        When the RA procedure is initiated on a Serving Cell, the MAC entity shall:
1>flush the MSG3 buffer;
1> flush the MSGA buffer;
1>set the PREAMBLE_TRANSMISSION_COUNTER to 1;
1> set the PREAMBLE_POWER RAMPING_COUNTER to 1;
1> set the PREAMBLE_BACKOFF to 0 ms;
1> set POW_OFFSET_2STEP_RA to 0;
1> if the carrier to use for the RA procedure is explicitly-signalled:
  2> select the signalled carrier for performing RA procedure;
  2>set the PCMAX to $P_{CMAX,f,c}$ of the signalled carrier.
1> else if the carrier to use for the RA procedure is not explicitly-signalled; and
1>if the Serving Cell for the RA procedure is configured with supplementary uplink as
  specified in TS 38.331; and
1>if the RSRP of the downlink pathloss reference is less than rsrp-ThresholdSSB-SUL:
  2> select the SUL carrier for performing RA procedure;
  2>set the PCMAX to $P_{CMAX,f,c}$ of the SUL carrier.
1>else:
  2>select the NUL carrier for performing RA procedure;
  2>set the PCMAX to $P_{CMAX,f,c}$ of the NUL carrier.
1> perform the BWP operation;
1> if RA procedure is initiated by PDCCH order and if the ra-PreambleIndex explicitly
  provided by PDCCH is not 0b000000; or
1> if the RA procedure was initiated for SI request (as specified in TS 38.331) and the
  Random Access Resources for SI request have been explicitly provided by RRC; or
1> if contention-free Random Access resources for 4-step random access are configured:
  2> set the RA_TYPE to 4-stepRA;
1> else if the rsrp-Threshold-msgA is configured and the RSRP of the downlink pathloss
  reference is above the configured rsrp-Threshold-msgA; or
1> if the BWP selected for RA procedure is only configured with 2-step random access
  resources (e.g., no 4-step RACH resources configured); or
1> if contention-free Random Access resources for 2-step random access are configured:
  2> set the RA_TYPE to 2-stepRA;

TABLE 3-continued

```
1> else:
    2> set the RA_TYPE to 4-stepRA;
1> perform initialization of variables specific to random access type;
1> if RA_TYPE is set to 2-stepRA:
    2> perform the random access resource selection procedure for 2-step random access;
1> else:
    2> perform the Random Access Resource selection procedure.
```

Initialization of Variables Specific to Random Access Type

An example of UE behavior for initialization of variables specific to Random Access type is illustrated in Table 4.

TABLE 4

```
The MAC entity shall:
1> if RA_TYPE is set to 2-stepRA:
    2> set PREAMBLE_POWER_RAMPING_STEP to msgApreamble-powerRampingStep;
    2> set SCALING_FACTOR_BI to 1;
    2> if the RA procedure was initiated for beam failure recovery; and
    2> if beamFailureRecoveryConfig is configured for the active UL BWP of the selected
        carrier:
        3> if msgApreamble-powerRampingStepHighPriority is configured in the
            beamFailureRecoveryConfig:
            4> set PREAMBLE_POWER_RAMPING_STEP to the msgApreamble-
                power RampingStepHighPriority.
        3> if scalingFactorBIMsgAis configured in the beamFailureRecoveryConfig:
            4> set SCALING_FACTOR_BI to the scalingFactorBIMsgA.
    2> else if the RA procedure was initiated for handover; and
    2> if rach-ConfigDedicated is configured for the selected carrier:
        3> if msgApreamble-powerRampingStepHighPriority is configured in the rach-
            ConfigDedicated:
            4> set PREAMBLE_POWER_RAMPING_STEP to the msgApreamble-
                powerRampingStepHighPriority.
        3> if scalingFactorBIMsgAis configured in the rach-ConfigDedicated:
            4> set SCALING_FACTOR_BI to the scalingFactorBIMsgA.
1> else: (e.g., RA_TYPE is set to 4-stepRA)
    2> set PREAMBLE_POWER_RAMPING_STEP to powerRampingStep;
    2> set SCALING_FACTOR_BI to 1;
    2> if the RA procedure was initiated for beam failure recovery; and
    2> if beamFailureRecoveryConfig is configured for the active UL BWP of the selected
        carrier:
        3> start the beamFailureRecoveryTimer, if configured;
        3> apply the parameters powerRampingStep, preambleReceivedTargetPower, and
            preambleTransMax configured in the beamFailureRecoveryConfig;
        3> if powerRampingStepHighPriority is configured in the
            beamFailureRecoveryConfig:
            4> set PREAMBLE_POWER_RAMPING_STEP to the
                powerRampingStepHighPriority.
        3> if scalingFactorBI is configured in the beamFailureRecoveryConfig:
            4> set SCALING_FACTOR_BI to the scalingFactorBI.
    2> else if the RA procedure was initiated for handover; and
    2> if rach-ConfigDedicated is configured for the selected carrier:
        3> if powerRampingStepHighPriority is configured in the rach-ConfigDedicated:
            4> set PREAMBLE_POWER_RAMPING_STEP to the
                powerRampingStepHighPriority.
        3> if scalingFactorBI is configured in the rach-ConfigDedicated:
            4> set SCALING_FACTOR_BI to the scalingFactorBI.
```

Random Access Resource Selection

An example of UE behavior for Random Access Resource selection is illustrated in Table 5.

TABLE 5

The MAC entity shall:
1> if the RA procedure was initiated for beam failure recovery; and
1> if the beamFailureRecoveryTimer is either running or not configured; and
1> if the contention-free Random Access Resources for beam failure recovery request associated with any of the SSBs and/or CSI-RSs have been explicitly provided by RRC; and
1> if at least one of the SSBs with SS-RSRP above rsrp-ThresholdSSB amongst the SSBs in candidate BeamRSList or the CSI-RSs with CSI-RSRP above rsrp-ThresholdCSI-RS amongst the CSI-RSs in candidateBeamRSList is available:
   2> select an SSB with SS-RSRP above rsrp-ThresholdSSB amongst the SSBs in candidate BeamRSList or a CSI-RS with CSI-RSRP above rsrp-ThresholdCSI-RS amongst the CSI-RSs in candidateBeamRSList,
   2> if CSI-RS is selected, and there is no ra-PreambleIndex associated with the selected CSI-RS:
      3> set the PREAMBLE_INDEX to a ra-PreambleIndex corresponding to the SSB in candidate BeamRSList which is quasi-co-located with the selected CSI-RS as specified in TS 38.214.
   2> else:
      3> set the PREAMBLE_INDEX to a ra-PreambleIndex corresponding to the selected SSB or CSI-RS from the set of Random Access Preambles for beam failure recovery request.
1> else if the ra-PreambleIndex has been explicitly provided by PDCCH; and
1> if the ra-PreambleIndex is not 0b000000:
   2> set the PREAMBLE_INDEX to the signalled ra-PreambleIndex;
   2> select the SSB signalled by PDCCH.
1> else if the contention-free Random Access Resources associated with SSBs have been explicitly provided in rach-ConfigDedicated and at least one SSB with SS-RSRP above rsrp-ThresholdSSB amongst the associated SSBs is available:
   2> select an SSB with SS-RSRP above rsrp-ThresholdSSB amongst the associated SSBs;
   2> set the PREAMBLE_INDEX to a ra-PreambleIndex corresponding to the selected SSB.
1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:
   2> select a CSI-RS with CSI-RSRP above rsrp-ThresholdCSI-RS amongst the associated CSI-RSs;
   2> set the PREAMBLE_INDEX to a ra-PreambleIndex corresponding to the selected CSI-RS.
1> else if the RA procedure was initiated for SI request (as specified in TS 38.331); and
1> if the Random Access Resources for SI request have been explicitly provided by RRC:
   2> if at least one of the SSBs with SS-RSRP above rsrp-ThresholdSSB is available:
      3> select an SSB with SS-RSRP above rsrp-ThresholdSSB.
   2> else:
      3> select any SSB.
   2> select a Random Access Preamble corresponding to the selected SSB, from the Random Access Preamble(s) determined according to ra-PreambleStartIndex as specified in TS 38.331;
   2> set the PREAMBLE_INDEX to selected Random Access Preamble.
1> else (e.g., for the contention-based Random Access preamble selection):
   2> if at least one of the SSBs with SS-RSRP above rsrp-ThresholdSSB is available:
      3> select an SSB with SS-RSRP above rsrp-ThresholdSSB.
   2> else:
      3> select any SSB.
   2> if MSG3 buffer is not empty:
      3> if Random Access Preambles group B is configured:
         4> if the potential MSG3 size (UL data available for transmission plus MAC header and, where required, MAC CEs) is greater than ra-Msg3SizeGroupA and the pathloss is less than PCMAX (of the Serving Cell performing the RA procedure) - preambleReceivedTargetPower - msg3-DeltaPreamble - messagePowerOffsetGroupB; or
         4> if the RA procedure was initiated for the CCCH logical channel and the CCCH SDU size plus MAC subheader is greater than ra-Msg3SizeGroupA:
            5> select the Random Access Preambles group B.
         4> else:
            5> select the Random Access Preambles group A.
      3> else:
         4> select the Random Access Preambles group A.
   2> else (e.g., MSG3 is being retransmitted):
      3> select the same group of Random Access Preambles as was used for the Random Access Preamble transmission attempt corresponding to the first transmission of MSG3.
   2> select a Random Access Preamble randomly with equal probability from the Random Access Preambles associated with the selected SSB and the selected Random Access Preambles group.

TABLE 5-continued

2> set the PREAMBLE_INDEX to the selected Random Access Preamble.
1> if the RA procedure was initiated for SI request (as specified in TS 38.331); and
1> if ra-AssociationPeriodIndex and si-RequestPeriod are configured:
 2> determine the next available PRACH occasion from the PRACH occasions
  corresponding to the selected SSB in the association period given by ra-
  AssociationPeriodIndex in the si-RequestPeriod permitted by the restrictions given by
  the ra-ssb-OccasionMaskIndex if configured (the MAC entity shall select a PRACH
  occasion randomly with equal probability amongst the consecutive PRACH occasions
  according to TS 38.213corresponding to the selected SSB).
1> else if an SSB is selected above:
 2> determine the next available PRACH occasion from the PRACH occasions
  corresponding to the selected SSB permitted by the restrictions given by the ra-ssb-
  OccasionMaskIndex if configured or indicated by PDCCH (the MAC entity shall
  select a PRACH occasion randomly with equal probability amongst the consecutive
  PRACH occasions according to TS 38.213, corresponding to the selected SSB; the
  MAC entity may take into account the possible occurrence of measurement gaps
  when determining the next available PRACH occasion corresponding to the selected
  SSB).
1> else if a CSI-RS is selected above:
 2> if there is no contention-free Random Access Resource associated with the selected
  CSI-RS:
  3> determine the next available PRACH occasion from the PRACH occasions,
   permitted by the restrictions given by the ra-ssb-OccasionMaskIndex if
   configured, corresponding to the SSB in candidateBeamRSList which is quasi-
   colocated with the selected CSI-RS as specified in TS 38.214 (the MAC entity
   shall select a PRACH occasion randomly with equal probability amongst the
   consecutive PRACH occasions according to TS 38.213, corresponding to the SSB
   which is quasi-colocated with the selected CSI-RS; the MAC entity may take into
   account the possible occurrence of measurement gaps when determining the next
   available PRACH occasion corresponding to the SSB which is quasi-colocated
   with the selected CSI-RS).
 2> else:
  3> determine the next available PRACH occasion from the PRACH occasions in ra-
   OccasionList corresponding to the selected CSI-RS (the MAC entity shall select a
   PRACH occasion randomly with equal probability amongst the PRACH occasions
   occurring simultaneously but on different subcarriers, corresponding to the
   selected CSI-RS; the MAC entity may take into account the possible occurrence of
   measurement gaps when determining the next available PRACH occasion
   corresponding to the selected CSI-RS).
1> perform the Random Access Preamble transmission procedure.
When the UE determines if there is an SSB with SS-RSRP above rsrp-ThresholdSSB or a
  CSI-RS with CSI-RSRP above rsrp-ThresholdCSI-RS, the UE uses the latest
  unfiltered L1-RSRP measurement.

Random Access Resource Selection for 2-Step Random Access

An example of UE behavior for Random Access Resource selection for 2-step random access is illustrated in Table 6.

TABLE 6

The MAC entity shall:
1> if the contention-free 2-step Random Access Resources associated with SSBs have been
 explicitly provided in rach-ConfigDedicated and at least one SSB with SS-RSRP above
 rsrp-ThresholdSSB amongst the associated SSBs is available:
 2> select an SSB with SS-RSRP above rsrp-ThresholdSSB amongst the associated SSBs;
 2> set the PREAMBLE_INDEX to a ra-PreambleIndex corresponding to the selected
  SSB.
1> else if the contention-free 2-step Random Access Resources associated with CSI-RSs
 have been explicitly provided in rach-ConfigDedicated and at least one CSI-RS with
 CSI-RSRP above rsrp-ThresholdCSI-RS amongst the associated CSI-RSs is available:
 2> select a CSI-RS with CSI-RSRP above rsrp-ThresholdCSI-RS amongst the associated
  CSI-RSs;
 2> set the PREAMBLE_INDEX to a ra-PreambleIndex corresponding to the selected
  CSI-RS.
1> else (e.g., for the contention-based Random Access Preamble selection):
 2> if at least one of the SSBs with SS-RSRP above rsrp-ThresholdSSB is available:
  3> select an SSB with SS-RSRP above rsrp-ThresholdSSB.
 2> else:
  3> select any SSB.
 2> if MSGA has not yet been transmitted:
  3> if Random Access Preambles group B for 2-step RA is configured:
   4> if the potential MSGA payload size (UL data available for transmission plus
    MAC header and, where required, MAC CEs) is greater than the transport block
    size of the MSGA payload associated with preamble group A and the nominal
    required PUSCH power for MSGA determined according to TS 38.213 is less
    than PCMAX (of the Serving Cell performing the RA procedure); or TABLE 6-continued 4> if the RA procedure was initiated for the CCCH logical channel and the CCCH
     SDU size plus MAC subheader is greater than the transport block size of the
     MSGA payload associated with preamble group A:
     5> select the Random Access Preambles group B.
    4> else:
     5> select the Random Access Preambles group A.
   3> else:
    4> select the Random Access Preambles group A.
  2> else (e.g., MSGA is being retransmitted):
   3> select the same group of Random Access Preambles as was used for the Random
    Access Preamble transmission attempt corresponding to the first transmission of
    MSGA.
  2> select a Random Access Preamble randomly with equal probability from the 2-step
   Random Access Preambles associated with the selected SSB and the selected
   Random Access Preambles group;
  2> set the PREAMBLE_INDEX to the selected Random Access Preamble;
 1> determine the next available PRACH occasion from the PRACH occasions
  corresponding to the selected SSB (the MAC entity shall select a PRACH occasion
  randomly with equal probability among the consecutive PRACH occasions allocated for
  2-step random access according to TS 38.213, corresponding to the selected SSB; the
  MAC entity may take into account the possible occurrence of measurement gaps when
  determining the next available PRACH occasion corresponding to the selected SSB);
 1> determine the UL grant and the associated HARQ information for the PUSCH resource
  of MSGA associated with the selected preamble and PRACH occasion according to TS
  38.213;
 1> deliver the UL grant and the associated HARQ information to the HARQ entity;
 1> perform the MSGA transmission procedure.
To determine if there is an SSB with SS-RSRP above rsrp-ThresholdSSB, the UE uses the
latest unfiltered L1-RSRP measurement.

Random Access Preamble Transmission

An example of UE behavior for Random Access Preamble transmission is illustrated in Table 7.

TABLE 7

The MAC entity shall, for each Random Access Preamble:
 1> if PREAMBLE_TRANSMISSION_COUNTER is greater than one; and
 1> if the notification of suspending power ramping counter has not been received from
  lower layers; and
 1> if SSB or CSI-RS selected is not changed from the selection in the last Random Access
  Preamble transmission:
  2> increment PREAMBLE_POWER_RAMPING_COUNTER by 1.
 1> select the value of DELTA_PREAMBLE;
 1> set PREAMBLE_RECEIVED_TARGET_POWER to preambleReceivedTargetPower +
  DELTA_PREAMBLE + (PREAMBLE_POWER_RAMPING_COUNTER − 1) ×
  PREAMBLE_POWER_RAMPING_STEP + POW_OFFSET_2STEP_RA;
 1> except for contention-free Random Access Preamble for beam failure recovery request,
  compute the RA-RNTI associated with the PRACH occasion in which the Random
  Access Preamble is transmitted;
 1> instruct the physical layer to transmit the Random Access Preamble using the selected
  PRACH occasion, corresponding RA-RNTI (if available), PREAMBLE_INDEX and
  PREAMBLE_RECEIVED_TARGET_POWER.
   The RA-RNTI associated with the PRACH occasion in which the Random
 Access Preamble is transmitted, is computed as:
   RA-RNTI = 1 + s_id + 14 × t_id + 14 × 80 × f_id + 14 × 80 × 8 × ul_carrier_id
  where s_id is the index of the first OFDM symbol of the PRACH occasion ($0 \leq$
 s_id < 14), t_id is the index of the first slot of the PRACH occasion in a system frame ($0 \leq$ t_id
 < 80), where the subcarrier spacing to determine t_id is based on the value of u specified in TS
 38.211, f id is the index of the PRACH occasion in the frequency domain ($0 \leq$ f_id < 8), and
 ul_carrier_id is the UL carrier used for Random Access Preamble transmission (0 for NUL
 carrier, and 1 for SUL carrier).

MSGA Transmission

An example of UE behavior for MSGA transmission is illustrated in Table 8.

TABLE 8

The MAC entity shall, for each MSGA:
1> if PREAMBLE_TRANSMISSION_COUNTER is greater than one; and
1> if the notification of suspending power ramping counter has not been received from
 lower layers; and TABLE 8-continued 1> if LBT failure indication was not received from lower layers for the last MSGA Random Access Preamble transmission; and
1> if SSB selected is not changed from the selection in the last Random Access Preamble transmission:
    2> increment PREAMBLE_POWER_RAMPING_COUNTER by 1.
1> select the value of DELTA_PREAMBLE;
1> set PREAMBLE_RECEIVED_TARGET_POWER to preambleReceivedTargetPower + DELTA_PREAMBLE + (PREAMBLE_POWER_RAMPING_COUNTER – 1) × PREAMBLE_POWER_RAMPING_STEP;
1> if this is the first MSGA transmission within this RA procedure:
    2> if the transmission is not being made for the CCCH logical channel:
        3> indicate to the Multiplexing and assembly entity to include a C-RNTI MAC CE in the subsequent uplink transmission.
    2> obtain the MAC PDU to transmit from the Multiplexing and assembly entity and store it in the MSGA buffer.
1> compute the MSGB-RNTI associated with the PRACH occasion in which the Random Access Preamble is transmitted;
1> instruct the physical layer to transmit the MSGA using the selected PRACH occasion and the associated PUSCH resource, using the corresponding RA-RNTI, MSGB-RNTI, PREAMBLE_INDEX, PREAMBLE_RECEIVED_TARGET_POWER;
1> if LBT failure indication is received from lower layers for the transmission of this MSGA Random Access Preamble:
    2> instruct the physical layer to cancel the transmission of the MSGA payload on the associated PUSCH resource;
    2> perform the Random Access Resource selection procedure for 2-step random access. The MSGA transmission includes the transmission of the PRACH Preamble as well as the contents of the MSGA buffer in the PUSCH resource corresponding to the selected PRACH occasion and PREAMBLE_INDEX (see TS 38.213)
        The MSGB-RNTI associated with the PRACH occasion in which the Random Access Preamble is transmitted, is computed as:
$$\text{MSGB-RNTI} = 1 + s\_id + 14 \times t\_id + 14 \times 80 \times f\_id + 14 \times 80 \times 8 \times ul\_carrier\_id + 14 \times 80 \times 8 \times 2$$
where s_id is the index of the first OFDM symbol of the PRACH occasion ($0 \le s\_id < 14$), t_id is the index of the first slot of the PRACH occasion in a system frame ($0 \le t\_id < 80$), where the subcarrier spacing to determine t_id is based on the value of u specified in TS 38.211, f id is the index of the PRACH occasion in the frequency domain ($0 \le f\_id < 8$), and ul_carrier_id is the UL carrier used for Random Access Preamble transmission (0 for NUL carrier, and 1 for SUL carrier). The RA-RNTI is calculated.

RAR Reception

An example of UE behavior for RAR reception is illustrated in Table 9.

TABLE 9

Once the Random Access Preamble is transmitted and regardless of the possible occurrence of a measurement gap, the MAC entity shall:
1> if the contention-free Random Access Preamble for beam failure recovery request was transmitted by the MAC entity:
    2> start the ra-Response Window configured in BeamFailureRecoveryConfig at the first PDCCH occasion as specified in TS 38.213 from the end of the Random Access Preamble transmission;
    2> monitor for a PDCCH transmission on the search space indicated by recoverySearchSpaceId of the SpCell identified by the C-RNTI while ra-Response Window is running.
1> else:
    2> start the ra-Response Window configured in RACH-ConfigCommon at the first PDCCH occasion as specified in TS 38.213 from the end of the Random Access Preamble transmission;
    2> monitor the PDCCH of the SpCell for RAR(s) identified by the RA-RNTI while the ra-ResponseWindow is running.
1> if notification of a reception of a PDCCH transmission on the search space indicated by recoverySearchSpaceId is received from lower layers on the Serving Cell where the preamble was transmitted; and
1> if PDCCH transmission is addressed to the C-RNTI; and
1> if the contention-free Random Access Preamble for beam failure recovery request was transmitted by the MAC entity:
    2> consider the RA procedure successfully completed.
1> else if a downlink assignment has been received on the PDCCH for the RA-RNTI and the received TB is successfully decoded:
    2> if the RAR contains a MAC subPDU with Backoff Indicator:
        3> set the PREAMBLE_BACKOFF to value of the BI field of the MAC subPDU using Table 7.2-1, multiplied with SCALING_FACTOR_BI.

TABLE 9-continued

```
    2> else:
        3> set the PREAMBLE_BACKOFF to 0 ms.
    2> if the RAR contains a MAC subPDU with Random Access Preamble identifier
        corresponding to the transmitted PREAMBLE_INDEX:
        3> consider this RAR reception successful.
    2> if the RAR reception is considered successful:
        3> if the RAR includes a MAC subPDU with RAPID only:
            4> consider this RA procedure successfully completed;
            4> indicate the reception of an acknowledgement for SI request to upper layers.
        3> else:
            4> apply the following actions for the Serving Cell where the Random Access
                Preamble was transmitted:
                5> process the received Timing Advance Command;
                5> indicate the preambleReceivedTargetPower and the amount of power
                    ramping applied to the latest Random Access Preamble transmission to
                    lower layers (e.g., (PREAMBLE_POWER_RAMPING_COUNTER – 1) ×
                    PREAMBLE_POWER_RAMPING_STEP);
                5> if the Serving Cell for the RA procedure is SRS-only SCell:
                    6> ignore the received UL grant.
                5> else:
                    6> process the received UL grant value and indicate it to the lower layers.
            4> if the Random Access Preamble was not selected by the MAC entity among the
                contention-based Random Access Preamble(s):
                5> consider the RA procedure successfully completed.
            4> else:
                5> set the TEMPORARY_C-RNTI to the value received in the RAR;
                5> if this is the first successfully received RAR within this RA procedure:
                    6> if the transmission is not being made for the CCCH logical channel:
                        7> indicate to the Multiplexing and assembly entity to include a C-RNTI
                            MAC CE in the subsequent uplink transmission.
                    6> obtain the MAC PDU to transmit from the Multiplexing and assembly
                        entity and store it in the MSG3 buffer.
If within an RA procedure, an uplink grant provided in the RAR for the same group of
    contention-based Random Access Preambles has a different size than the first
    uplink grant allocated during that RA procedure, the UE behavior is not defined.
1> if ra-ResponseWindow configured in BeamFailureRecoveryConfig expires and if a
    PDCCH transmission on the search space indicated by recoverySearchSpaceId
    addressed to the C-RNTI has not been received on the Serving Cell where the preamble
    was transmitted; or
1> if ra-ResponseWindow configured in RACH-ConfigCommon expires, and if the RAR
    containing Random Access Preamble identifiers that matches the transmitted
    PREAMBLE_INDEX has not been received:
    2> consider the RAR reception not successful;
    2> increment PREAMBLE_TRANSMISSION_COUNTER by 1;
    2> if PREAMBLE_TRANSMISSION_COUNTER = preamble TransMax + 1:
        3> if the Random Access Preamble is transmitted on the SpCell:
            4> indicate a Random Access problem to upper layers;
            4> if this RA procedure was triggered for SI request:
                5> consider the RA procedure unsuccessfully completed.
        3> else if the Random Access Preamble is transmitted on a SCell:
            4> consider the RA procedure unsuccessfully completed.
    2> if the RA procedure is not completed:
        3> select a random back-off time according to a uniform distribution between 0 and
            the PREAMBLE_BACKOFF;
        3> if the criteria to select contention-free Random Access Resources is met during the
            back-off time:
            4> perform the Random Access Resource selection procedure;
        3> else:
            4> perform the Random Access Resource selection procedure after the back-off
                time.
            The MAC entity may stop ra-ResponseWindow (and hence monitoring for
RAR(s)) after successful reception of an RAR containing Random Access Preamble identifiers
that matches the transmitted PREAMBLE_INDEX.
HARQ operation is not applicable to the RAR reception.
```

MSGB Reception and Contention Resolution for 2-Step Random Access

An example of UE behavior for MSGB reception and contention resolution for 2-step random access is illustrated in Table 10.

TABLE 10

```
Once the MSGA is transmitted, regardless of the possible occurrence of a measurement gap,
the MAC entity shall:
1> start the msgB-Response Window at the first PDCCH occasion from the end of the
    MSGA transmission as specified in TS 38.213;
```

TABLE 10-continued

1> monitor the PDCCH of the SpCell for an RAR identified by MSGB-RNTI while the
msgB-ResponseWindow is running;
1> if C-RNTI MAC CE was included in the MSGA:
  2> monitor the PDCCH of the SpCell for RAR identified by the C-RNTI while the
msgB-ResponseWindow is running;
1> if notification of a reception of a PDCCH transmission of the SpCell is received from
lower layers:
  2> if the C-RNTI MAC CE was included in MSGA:
    3> if the RA procedure was initiated for beam failure recovery and the PDCCH
transmission is addressed to the C-RNTI:
      4> consider this RAR reception successful;
      4> stop the msgB-Response Window;
      4> consider this RA procedure successfully completed.
    3> else if the timeAlignmentTimer associated with the PTAG is running:
      4> if the PDCCH transmission is addressed to the C-RNTI and contains a UL
grant for a new transmission:
        5> consider this RAR reception successful;
        5> stop the msgB-Response Window;
        5> consider this RA procedure successfully completed.
    3> else:
      4> if a downlink assignment has been received on the PDCCH for the C-RNTI and
the received TB is successfully decoded:
        5> if the MAC PDU contains the Absolute Timing Advance Command MAC
CE:
          6> consider this RAR reception successful;
          6> stop the msgB-ResponseWindow;
          6> consider this RA procedure successfully completed.
  2> if a downlink assignment has been received on the PDCCH for the MSGB-RNTI and
the received TB is successfully decoded:
    3> if the MSGB contains a MAC subPDU with Backoff Indicator:
      4> set the PREAMBLE_BACKOFF to value of the BI field of the MAC subPDU
using Table 7.2-1.
    3> else:
      4> set the PREAMBLE_BACKOFF to 0 ms.
    3> if the MSGB contains a fallbackRAR MAC subPDU; and
    3> if the Random Access Preamble identifier in the MAC subPDU matches the
transmitted PREAMBLE_INDEX:
      4> consider this RAR reception successful;
      4> apply the following actions for the SpCell:
        5> process the received Timing Advance Command;
        5> set the TEMPORARY_C-RNTI to the value received in the fallbackRAR;
        5> indicate the preambleReceivedTargetPower and the amount of power
ramping applied to the latest Random Access Preamble transmission to
lower layers (e.g., (PREAMBLE_POWER_RAMPING_COUNTER – 1) ×
PREAMBLE_POWER_RAMPING_STEP);
        5> if the MSG3 buffer is empty:
          6> obtain the MAC PDU to transmit from the MSGA buffer and store it in
the MSG3 buffer;
        5> process the received UL grant value and indicate it to the lower layers and
proceed with MSG3 transmission;
          If within an RA procedure with 2-step RA type, an uplink grant provided in the fallback
RAR has a different size than the MSGA payload, the UE behavior is not defined.
    3> else if the MSGB contains a successRAR MAC subPDU; and
    3> if the CCCH SDU was included in the MSGA and the UE Contention Resolution
Identity in the MAC subPDU matches the CCCH SDU:
      4> if this RA procedure was initiated for SI request:
        5> indicate the reception of an acknowledgement for SI request to upper layers.
      4> else:
        5> set the C-RNTI to the value received in the successRAR;
        5> apply the following actions for the SpCell:
          6> process the received Timing Advance Command;
          6> indicate the preambleReceivedTargetPower and the amount of power
ramping applied to the latest Random Access Preamble transmission to
lower layers (e.g., (PREAMBLE_POWER_RAMPING_COUNTER – 1) ×
PREAMBLE_POWER_RAMPING_STEP);
      4> deliver the TPC, PUCCH resource Indicator and HARQ feedback Timing
Indicator received in successRAR to lower layers and instruct the lower layers
to generate HARQ feedback for the successRAR, as specified in 38.213.
      4> consider this RAR reception successful;
      4> consider this RA procedure successfully completed;
      4> finish the disassembly and demultiplexing of the MAC PDU.
1> if msgB -Response Window expires, and the RAR Reception has not been considered as
successful based on descriptions above:
  2> increment PREAMBLE_TRANSMISSION_COUNTER by 1;
  2> if PREAMBLE_TRANSMISSION_COUNTER = preamble TransMax + 1:
    3> indicate a Random Access problem to upper layers;
    3> if this RA procedure was triggered for SI request:
      4> consider this RA procedure unsuccessfully completed.

TABLE 10-continued

2> if the RA procedure is not completed:
   3> select a random back-off time according to a uniform distribution between 0 and
      the PREAMBLE_BACKOFF;
   3> if msgATransMax is configured, and
      PREAMBLE_TRANSMISSION_COUNTER = msgATransMax + 1:
      4> set the RA_TYPE to 4-stepRA;
      4> set POW OFFSET 2STEP RA to
         (PREAMBLE_TRANSMISSION_COUNTER − 1) × (msgApreamble-
         powerRampingStep − powerRampingStep);
      4> perform initialization of variables specific to random access type;
      4> if the MSG3 buffer is empty:
         5> obtain the MAC PDU to transmit from the MSGA buffer and store it in the
            MSG3 buffer;
      4> flush HARQ buffer used for the transmission of MAC PDU in the MSGA
         buffer;
      4> perform the Random Access Resource selection procedure.
   3> else:
      4> perform the Random Access Resource selection procedure for 2-step random
         access after the back-off time.
   Upon receiving a fallbackRAR, the MAC entity may stop msgB-
ResponseWindow once the RAR reception is considered as successful Contention Resolution An example of UE behavior for Contention Resolution is illustrated in Table 11.

TABLE 11

Once MSG3 is transmitted, the MAC entity shall:
1> start the ra-ContentionResolutionTimer and restart the ra-ContentionResolutionTimer at
   each HARQ retransmission in the first symbol after the end of the MSG3 transmission;
1> monitor the PDCCH while the ra-ContentionResolutionTimer is running regardless of
   the possible occurrence of a measurement gap;
1> if notification of a reception of a PDCCH transmission of the SpCell is received from
   lower layers:
   2> if the C-RNTI MAC CE was included in MSG3:
      3> if the RA procedure was initiated for beam failure recovery and the PDCCH
         transmission is addressed to the C-RNTI; or
      3> if the RA procedure was initiated by a PDCCH order and the PDCCH transmission
         is addressed to the C-RNTI; or
      3> if the RA procedure was initiated by the MAC sublayer itself or by the RRC
         sublayer and the PDCCH transmission is addressed to the C-RNTI and contains a
         UL grant for a new transmission:
         4> consider this Contention Resolution successful;
         4> stop ra-ContentionResolutionTimer;
         4> discard the TEMPORARY_C-RNTI;
         4> consider this RA procedure successfully completed.
   2> else if the CCCH SDU was included in MSG3 and the PDCCH transmission is
      addressed to its TEMPORARY_C-RNTI:
      3> if the MAC PDU is successfully decoded:
         4> stop ra-ContentionResolutionTimer;
         4> if the MAC PDU contains a UE Contention Resolution Identity MAC CE; and
         4> if the UE Contention Resolution Identity in the MAC CE matches the CCCH
            SDU transmitted in MSG3:
            5> consider this Contention Resolution successful and finish the disassembly
               and demultiplexing of the MAC PDU;
            5> if this RA procedure was initiated for SI request:
               6> indicate the reception of an acknowledgement for SI request to upper
                  layers.
            5> else:
               6> set the C-RNTI to the value of the TEMPORARY_C-RNTI;
            5> discard the TEMPORARY_C-RNTI;
            5> consider this RA procedure successfully completed.
         4> else:
            5> discard the TEMPORARY_C-RNTI;
            5> consider this Contention Resolution not successful and discard the
               successfully decoded MAC PDU.
1> if ra-ContentionResolutionTimer expires:
   2> discard the TEMPORARY_C-RNTI;
   2> consider the Contention Resolution not successful.
1> if the Contention Resolution is considered not successful:
   2> flush the HARQ buffer used for transmission of the MAC PDU in the MSG3 buffer;
   2> increment PREAMBLE_TRANSMISSION_COUNTER by 1;
   2> if PREAMBLE_TRANSMISSION_COUNTER = preambleTransMax + 1:
      3> indicate a Random Access problem to upper layers.
      3> if this RA procedure was triggered for SI request:
         4> consider the RA procedure unsuccessfully completed.

TABLE 11-continued

```
2> if the RA procedure is not completed:
    3> select a random back-off time according to a uniform distribution between 0 and
       the PREAMBLE_BACKOFF;
    3> if the criteria to select contention-free Random Access Resources is met during the
       back-off time:
        4> perform the Random Access Resource selection procedure;
    3> else if the RA_TYPE is set to 2-stepRA:
        4> if msgATransMax is configured and
           PREAMBLE_TRANSMISSION_COUNTER = msgATransMax + 1:
            5> set the RA_TYPE to 4-stepRA;
            5> set POW_OFFSET_2STEP_RA to
               (PREAMBLE_TRANSMISSION_COUNTER − 1) × (msgApreamble-
               powerRampingStep - powerRampingStep);
            5> perform initialization of variables specific to random access type;
            5> flush HARQ buffer used for the transmission of MAC PDU in the MSGA
               buffer; 5> perform the Random Access Resource selection.
        4> else:
            5> perform the Random Access Resource selection for RA procedure with 2-
               step RA type after the back-off time.
    3> else:
        4> perform the Random Access Resource selection after the back-off time.
        (a) Completion of the RA procedure
            Upon completion of the RA procedure, the MAC entity shall:
1> discard explicitly-signalled contention-free Random Access Resources except
   contention-free Random Access Resources for beam failure recovery request, if any;
1> flush the HARQ buffer used for transmission of the MAC PDU in the MSG3 buffer and
   the MSGA buffer.
```

Figure 9:
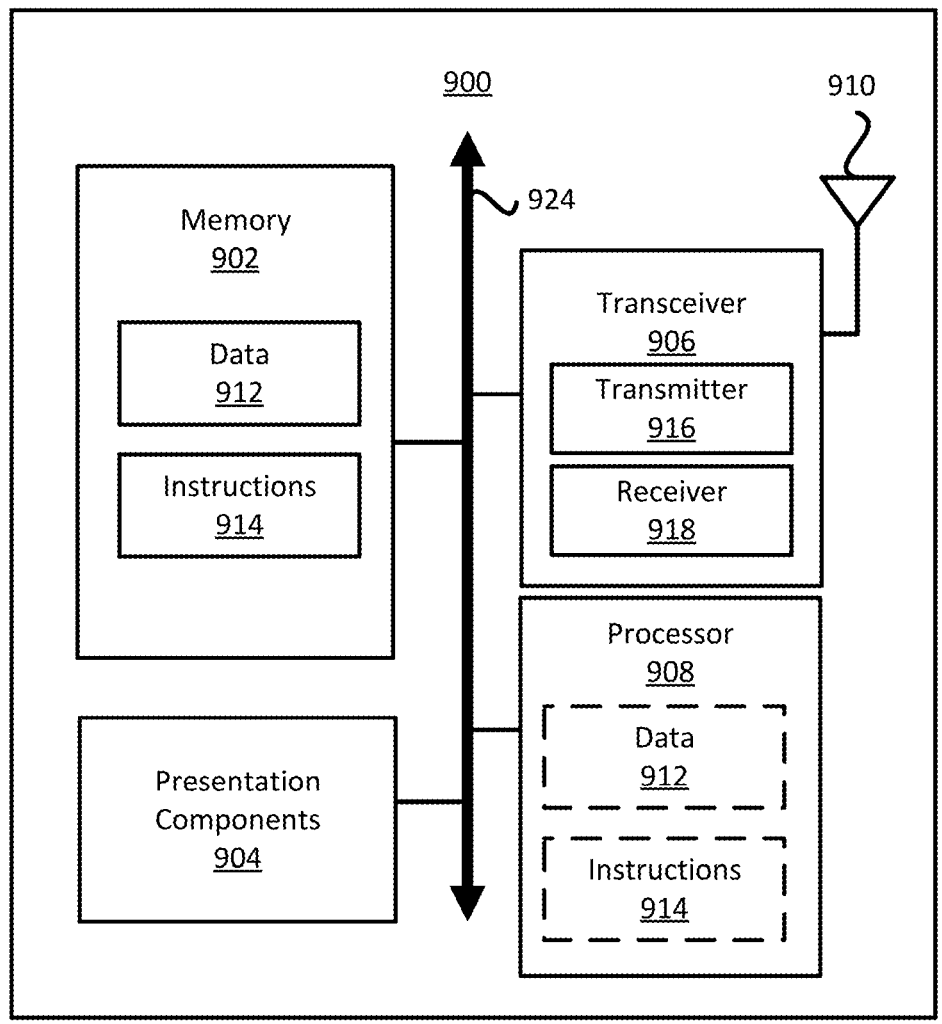
FIG. 9 illustrates a block diagram of a node for wireless communication according to an implementation of the present disclosure.

FIG. 9 illustrates a block diagram of a node 900 for wireless communication according to an implementation of the present disclosure. As illustrated in FIG. 9, the node 900 may include a transceiver 906, a processor 908, a memory 902, one or more presentation components 904, and at least one antenna 910. The node 900 may also include a radio frequency (RF) spectrum band module, a BS communications module, a network communications module, and a system communications management module, Input/Output (I/O) ports, I/O components, and a power supply (not explicitly illustrated in FIG. 9).

Each of these components may be in communication with each other, directly or indirectly, over one or more buses 924. The node 900 may be a UE or a BS that performs various functions described herein, for example, with reference to FIGS. 1 through 8.

The transceiver 906 having a transmitter 916 (e.g., transmitting/transmission circuitry) and a receiver 918 (e.g., receiving/reception circuitry) may be configured to transmit and/or receive time and/or frequency resource partitioning information. The transceiver 906 may be configured to transmit in different types of subframes and slots, including, but not limited to, usable, non-usable and flexibly usable subframes and slot formats. The transceiver 906 may be configured to receive data and control channels.

The node 900 may include a variety of computer-readable media. Computer-readable media can be any available media that can be accessed by the node 900 and include both volatile (and non-volatile) media and removable (and non-removable) media. By way of example, and not limitation, computer-readable media may include computer storage media and communication media. Computer storage media may include both volatile (and/or non-volatile) and removable (and/or non-removable) media implemented according to any method or technology for storage of information such as computer-readable instructions, data structures, program modules, or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal.

Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. Combinations of any of the previously disclosed communication media should also be included within the scope of computer-readable media.

The memory 902 may include computer storage media in the form of volatile and/or non-volatile memory. The memory 902 may be removable, non-removable, or a combination thereof. For example, the memory 902 may include solid-state memory, hard drives, optical-disc drives, etc. As illustrated in FIG. 9, the memory 902 may store computer-readable and/or computer-executable instructions 914 (e.g., software code(s) or computer-executable program(s)) that are configured to, when executed, cause the processor 908 to perform various functions described herein, for example, with reference to FIGS. 1 through 8. Alternatively, the instructions 914 may not be directly executable by the processor 908 but may be configured to cause the node 900 (e.g., when compiled and executed) to perform various functions described herein.

The processor 908 (e.g., having processing circuitry) may include an intelligent hardware device, a Central Processing Unit (CPU), a microcontroller, an ASIC, etc. The processor 908 may include memory. The processor 908 may process the data 912 and the instructions 914 received from the memory 902, and information through the transceiver 906, the baseband communications module, and/or the network communications module. The processor 908 may also process information to be sent to the transceiver 906 for transmission through the antenna 910, to the network communications module for transmission to a CN.

One or more presentation components 904 may present data indications to a person or other devices. Examples of presentation components 904 may include a display device, speaker, printing component, vibrating component, etc.

From the present disclosure, it is manifested that various techniques may be used for implementing the concepts described in the present application without departing from the scope of those concepts. Moreover, while the concepts have been disclosed with specific reference to certain implementations, a person of ordinary skill in the art would recognize that changes may be made in form and detail without departing from the scope of those concepts. As such, the disclosed implementations are to be considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:

1. A wireless communication method of a User Equipment (UE) for performing Random Access (RA) operations, the wireless communication method comprising:
receiving a Radio Resource Control (RRC) message that indicates a first Physical Uplink Shared Channel (PUSCH) resource for Message A (MSGA) payload transmission;
triggering a Scheduling Request (SR) procedure;
determining whether at least one valid Physical Uplink Control Channel (PUCCH) resource is configured for the SR procedure;
initiating an RA procedure after triggering the SR procedure in response to determining that no valid PUCCH resource is configured for the SR procedure;
determining that a second PUSCH resource is available while the RA procedure is ongoing, wherein the second PUSCH resource is not indicated as the first PUSCH resource for the MSGA payload transmission and is not indicated by an uplink grant provided in a Random Access Response (RAR);
determining, while the RA procedure is ongoing, whether a Medium Access Control (MAC) Protocol Data Unit (PDU) including a Buffer Status Reporting (BSR) MAC Control Element (CE) has been transmitted on the first PUSCH resource, the second PUSCH resource, or a third PUSCH resource indicated by the uplink grant provided in the RAR;
stopping the ongoing RA procedure in response to determining that the MAC PDU including the BSR MAC CE has been transmitted on the second PUSCH resource or the second PUSCH resource is available for transmitting all pending data; and
continuing the ongoing RA procedure until the RA procedure is completed in response to determining that the MAC PDU including the BSR MAC CE has been transmitted on the first PUSCH resource or on the third PUSCH resource or the first PUSCH resource is available for transmitting all the pending data.

2. The wireless communication method of claim 1, wherein the RRC message includes a PUSCH configuration for MSGA, the PUSCH configuration for MSGA indicating an allocation of the first PUSCH resource.

3. The wireless communication method of claim 2, wherein the PUSCH configuration for MSGA comprises an information element MsgA-PUSCH-Config.

4. The wireless communication method of claim 1, wherein the pending data includes data from a Logical Channel (LCH) indicated by a network via one of RRC signaling, a MAC CE, and Downlink Control Information (DCI).

5. The wireless communication method of claim 1, wherein the pending data includes data from a Logical Channel (LCH) having a priority value higher than a threshold indicated by a network via one of RRC signaling, a MAC CE, and Downlink Control Information (DCI).

6. A User Equipment (UE) for performing Random Access (RA) operations, the UE comprising:
at least one processor; and
at least one memory coupled to the at least one processor, the at least one memory storing one or more computer-executable instructions that, when executed by the at least one processor, cause the UE to:
receive a Radio Resource Control (RRC) message that indicates a first Physical Uplink Shared Channel (PUSCH) resource for Message A (MSGA) payload transmission;
trigger a Scheduling Request (SR) procedure;
determine whether at least one valid Physical Uplink Control Channel (PUCCH) resource is configured for the SR procedure;
initiate an RA procedure after triggering the SR procedure in response to determining that no valid PUCCH is configured for the SR procedure;
determine that a second PUSCH resource is available while the RA procedure is ongoing, wherein the second PUSCH resource is not indicated as the first PUSCH resource for the MSGA payload transmission and is not indicated by an uplink grant provided in a Random Access Response (RAR);
determine, while the RA procedure is ongoing, whether a Medium Access Control (MAC) Protocol Data Unit (PDU) including a Buffer Status Reporting (BSR) MAC Control Element (CE) has been transmitted on the first PUSCH resource, the second PUSCH resource, or a third PUSCH resource indicated by the uplink grant provided in the RAR;
stop the ongoing RA procedure in response to determining that the MAC PDU including the BSR MAC CE has been transmitted on the second PUSCH resource or the second PUSCH resource is available for transmitting all pending data; and
continue the ongoing RA procedure until the RA procedure is completed in response to determining that the MAC PDU including the BSR MAC CE has been transmitted on the first PUSCH resource or on the third PUSCH resource or the first PUSCH resource is available for transmitting all the pending data.

7. The UE of claim 6, wherein the RRC message includes a PUSCH configuration for MSGA, the PUSCH configuration for MSGA indicating an allocation of the first PUSCH resource.

8. The UE of claim 7, wherein the PUSCH configuration for MSGA comprises as information element MsgA-PUSCH-Config.

9. The UE of claim 6, wherein the pending data includes data from a Logical Channel (LCH) indicated by a network via one of RRC signaling, a MAC CE, and Downlink Control Information (DCI).

10. The UE of claim 6, wherein the pending data includes data from a Logical Channel (LCH) having a priority value higher than a threshold indicated by a network via one of RRC signaling, a MAC CE, and Downlink Control Information (DCI).

* * * * *